United States Patent
Andersen et al.

(10) Patent No.: US 6,231,970 B1
(45) Date of Patent: May 15, 2001

(54) THERMOPLASTIC STARCH COMPOSITIONS INCORPORATING A PARTICULATE FILLER COMPONENT

(75) Inventors: Per Just Andersen; Simon K. Hodson, both of Santa Barbara, CA (US)

(73) Assignee: E. Khashoggi Industries, LLC, Santa Barbara, CA (US)

( * ) Notice: Subject to any disclaimer, the term of this patent is extended or adjusted under 35 U.S.C. 154(b) by 0 days.

(21) Appl. No.: 09/480,262

(22) Filed: Jan. 11, 2000

(51) Int. Cl.[7] ............................. C08L 3/02; C08L 67/00
(52) U.S. Cl. .............. 428/332; 106/145.1; 106/206.1; 106/217.9; 524/47; 525/54.24; 536/102
(58) Field of Search .................. 524/47; 525/54.24; 536/102; 106/145.1, 206.1, 217.9; 428/332

(56) References Cited

U.S. PATENT DOCUMENTS

| | | | |
|---|---|---|---|
| 3,850,863 | 11/1974 | Clendinning et al. | 260/7.5 |
| 3,867,324 | 2/1975 | Clendinning et al. | 260/23 H |
| 3,921,333 | 11/1975 | Clendinning et al. | 47/37 |
| 3,949,145 | 4/1976 | Otey et al. | 428/423 |
| 4,076,846 | 2/1978 | Nakatsuka et al. | 426/62 |
| 4,133,784 | 1/1979 | Otey et al. | 260/17.4 |
| 4,306,059 | 12/1981 | Yokobayashi et al. | 536/1 |
| 4,377,440 | 3/1983 | Gåsland | 162/101 |
| 4,378,271 | 3/1983 | Hargreaves et al. | 162/145 |
| 4,394,930 | 7/1983 | Korpman | 220/444 |
| 4,410,571 | 10/1983 | Korpman | 427/385.5 |
| 4,454,268 | 6/1984 | Otey et al. | 524/47 |
| 4,482,386 | 11/1984 | Wittwer et al. | 106/135 |
| 4,508,595 | 4/1985 | Gåsland | 162/158 |
| 4,655,840 | 4/1987 | Wittwer et al. | 106/126 |
| 4,673,438 | 6/1987 | Wittwer et al. | 106/126 |
| 4,863,655 | 9/1989 | Lacourse et al. | 264/53 |
| 4,919,758 | 4/1990 | Wagle et al. | 162/175 |
| 5,035,930 | 7/1991 | Lacourse et al. | 428/35.6 |
| 5,043,196 | 8/1991 | Lacourse et al. | 428/35.6 |
| 5,059,642 | 10/1991 | Jane et al. | 524/52 |
| 5,095,054 | 3/1992 | Lay et al. | 524/47 |
| 5,104,669 | 4/1992 | Wolke et al. | 426/94 |

(List continued on next page.)

FOREIGN PATENT DOCUMENTS

| | | |
|---|---|---|
| 0 032 802 A1 | 1/1981 | (EP) . |
| 0 265 745 A2 | 5/1988 | (EP) . |
| 0 327 505 A2 | 8/1989 | (EP) . |
| 0 408 502 A2 | 12/1989 | (EP) . |
| 0 408 503 A2 | 12/1989 | (EP) . |
| 0 409 781 A2 | 12/1989 | (EP) . |
| 0 400 532 A1 | 12/1990 | (EP) . |
| 0 407 350 A2 | 1/1991 | (EP) . |
| 0 409 782 A3 | 1/1991 | (EP) . |
| 0 444 880 B1 | 4/1991 | (EP) . |
| 0 524 920 A1 | 1/1993 | (EP) . |
| 0 525 245 A1 | 2/1993 | (EP) . |
| 0 535 994 A1 | 4/1993 | (EP) . |
| 0 556 774 A2 | 8/1993 | (EP) . |
| 0 587 078 A1 | 3/1994 | (EP) . |
| 0 609 983 A2 | 8/1994 | (EP) . |
| 0 397 819 B1 | 4/1995 | (EP) . |
| 0 539 541 B1 | 7/1997 | (EP) . |
| 0 596 437 B1 | 10/1997 | (EP) . |
| 2 050 459 | 6/1983 | (GB) . |
| 3-263441 | 11/1991 | (JP) . |
| 5-105815 | 4/1993 | (JP) . |
| 5-171049 | 7/1993 | (JP) . |
| 5-246417 | 9/1993 | (JP) . |
| 5-230401 | 12/1993 | (JP) . |
| 6-32386 | 2/1994 | (JP) . |
| 6-135487 | 5/1994 | (JP) . |
| WO 87/00828 | 2/1987 | (WO) . |
| WO 90/05161 | 5/1990 | (WO) . |
| WO 91/12186 | 8/1991 | (WO) . |
| WO 93/00399 | 1/1993 | (WO) . |
| WO 94/18384 | 8/1994 | (WO) . |
| WO 96/30186 | 10/1996 | (WO) . |

OTHER PUBLICATIONS

Tokiwa et al., *Development of Biodegradable Plastics Containing Polycaprolactone and/or Starch*, Polym. Mater. Sci. Eng. (1990).

Weingarten, *Biodegradabe Polymers—Packing Material for the Future?*, Forum Werkstofftechnik (1989) no month.

Westerhausen, et al., *Investigation for the Use of Biodegradable Synthetic Material for Packaging*, (1990) no month.

*Primary Examiner*—Blaine Copenheaver
(74) *Attorney, Agent, or Firm*—Workman, Nydegger & Seeley

(57) ABSTRACT

Thermoplastic starch compositions that include a particulate filler, e.g. an inorganic filler component, and optional fibrous component The compositions include a thermoplastic phase comprising a thermoplastic starch melt that contains, at a minimum, starch blended with an appropriate plasticizing agent under conditions in order for the starch to form a thermoplastic melt. The thermoplastic phase may also include one or more additional thermoplastic polymers and other optional reactants, liquids or cross-linking agents to improve the water-resistance, strength, and/or other mechanical properties of the thermoplastic melt, particularly upon solidification. The inorganic filler component may affect the mechanical properties but will mainly be added to reduce the cost of the thermoplastic starch compositions by displacing a significant portion of the more expensive starch or starch/polymer melt. Fibers may optionally be included in order to improve the mechanical properties of the thermoplastic starch compositions. The thermoplastic starch compositions may be shaped into a wide variety of useful articles, such as sheets, films, containers, and packaging materials. Because the thermoplastic starch compositions will typically include a thermoplastic phase that is biodegradable, and because the other components will either constitute a naturally occurring mineral and optionally a natural fiber, the overall composition will typically be more environmentally friendly compared to conventional thermoplastic materials.

96 Claims, No Drawings

U.S. PATENT DOCUMENTS

| | | | |
|---|---|---|---|
| 5,108,807 | 4/1992 | Tucker | 428/35.2 |
| 5,110,838 | 5/1992 | Tokiwa et al. | 521/81 |
| 5,115,000 | 5/1992 | Jane et al. | 524/47 |
| 5,153,037 | 10/1992 | Altieri | 428/35.6 |
| 5,160,368 | 11/1992 | Begovich | 106/154.1 |
| 5,162,126 | 11/1992 | Thömer et al. | 426/138 |
| 5,185,382 | 2/1993 | Neumann et al. | 521/84.1 |
| 5,186,990 | 2/1993 | Starcevich | 428/35.6 |
| 5,206,087 | 4/1993 | Tokiwa et al. | 428/403 |
| 5,208,267 | 5/1993 | Neumann et al. | 521/79 |
| 5,234,977 | 8/1993 | Bastioli et al. | 524/47 |
| 5,234,978 | 8/1993 | Delrue et al. | 524/53 |
| 5,242,078 | 9/1993 | Haas et al. | 220/574 |
| 5,248,702 | 9/1993 | Neumann et al. | 521/84.1 |
| 5,252,271 | 10/1993 | Jeffs | 264/54 |
| 5,256,711 | 10/1993 | Tokiwa et al. | 524/47 |
| 5,258,430 | 11/1993 | Bastioli et al. | 524/52 |
| 5,262,458 | 11/1993 | Bastioli et al. | 524/52 |
| 5,266,368 | 11/1993 | Miller | 428/35.6 |
| 5,272,181 | 12/1993 | Boehmer et al. | 521/84.1 |
| 5,275,774 | 1/1994 | Bahr et al. | 264/211 |
| 5,280,055 | 1/1994 | Tomka | 524/47 |
| 5,286,770 | 2/1994 | Bastioli et al. | 524/52 |
| 5,288,318 | 2/1994 | Mayer et al. | 106/213 |
| 5,288,765 | 2/1994 | Bastioli et al. | 521/84.1 |
| 5,290,350 | 3/1994 | Besnard et al. | 106/214 |
| 5,292,782 | 3/1994 | Bastioli et al. | 524/47 |
| 5,296,526 | 3/1994 | Delrue et al. | 524/50 |
| 5,308,879 | 5/1994 | Akamatu et al. | 521/84.1 |
| 5,310,070 | 5/1994 | Haas et al. | 220/4.24 |
| 5,314,754 | 5/1994 | Knight | 428/532 |
| 5,314,934 | 5/1994 | Tomka | 524/53 |
| 5,317,037 | 5/1994 | Golden et al. | 523/128 |
| 5,320,669 | 6/1994 | Lim et al. | 106/157 |
| 5,346,541 | 9/1994 | Goldman et al. | 106/163.1 |
| 5,360,473 | 11/1994 | Fleche et al. | 106/210 |
| 5,360,586 | 11/1994 | Wyatt et al. | 264/54 |
| 5,360,828 | 11/1994 | Morrison | 521/64 |
| 5,360,830 | 11/1994 | Bastioli et al. | 521/84.1 |
| 5,360,844 | 11/1994 | Delrue et al. | 524/50 |
| 5,362,776 | 11/1994 | Barenburg et al. | 524/35 |
| 5,362,777 | 11/1994 | Tomka | 524/47 |
| 5,367,067 | 11/1994 | Frische et al. | 536/45 |
| 5,372,877 | 12/1994 | Kannankeril | 428/283 |
| 5,376,320 | 12/1994 | Tiefenbacher et al. | 264/50 |
| 5,378,418 | 1/1995 | Berger et al. | 264/83 |
| 5,382,285 | 1/1995 | Morrison | 106/122 |
| 5,382,611 | 1/1995 | Stepto et al. | 524/47 |
| 5,389,322 | 2/1995 | Kim et al. | 264/112 |
| 5,393,804 | 2/1995 | George et al. | 523/128 |
| 5,397,834 | 3/1995 | Jane et al. | 525/54.1 |
| 5,405,564 | 4/1995 | Stepto et al. | 264/115 |
| 5,412,005 | 5/1995 | Bastioli et al. | 524/47 |
| 5,415,827 | 5/1995 | Tomka et al. | 264/510 |
| 5,427,614 | 6/1995 | Wittwer et al. | 106/213 |
| 5,428,150 | 6/1995 | De Bock et al. | 536/102 |
| 5,436,078 | 7/1995 | Bühler et al. | 428/474.4 |
| 5,462,980 | 10/1995 | Bastioli et al. | 524/47 |
| 5,462,982 | 10/1995 | Bastioli et al. | 524/47 |
| 5,470,382 | 11/1995 | Andou | 106/124 |
| 5,476,621 | 12/1995 | Kustner | 264/53 |
| 5,480,923 | 1/1996 | Schmid et al. | 524/47 |
| 5,500,089 | 3/1996 | Huang et al. | 162/226 |
| 5,506,277 | 4/1996 | Griesbach, III | 521/84.1 |
| 5,512,090 | 4/1996 | Franke et al. | 106/154.1 |
| 5,512,378 | 4/1996 | Bastioli et al. | 428/484 |
| 5,523,293 | 6/1996 | Jane et al. | 514/21 |
| 5,525,281 | 6/1996 | Lörcks et al. | 264/101 |
| 5,534,150 | 7/1996 | Bastioli et al. | 210/640 |
| 5,569,692 | 10/1996 | Bastioli et al. | 524/47 |
| 5,576,049 | 11/1996 | Haas et al. | 427/389.9 |
| 5,589,518 | 12/1996 | Bastioli et al. | 521/55 |
| 5,663,216 | 9/1997 | Tomka | 523/128 |
| 5,705,536 | 1/1998 | Tomka | 521/84.1 |
| 5,711,908 | 1/1998 | Tiefenbacher et al. | 264/232 |
| 5,844,023 | 12/1998 | Tomka | 524/47 |
| 5,849,152 | 12/1998 | Arnold et al. | 162/116 |
| 6,096,809 * | 8/2000 | Lorcks et al. | 524/47 |

* cited by examiner

THERMOPLASTIC STARCH COMPOSITIONS INCORPORATING A PARTICULATE FILLER COMPONENT

BACKGROUND OF THE INVENTION

1. The Field of the Invention

The present invention relates to compositions and methods for manufacturing thermoplastic starch compositions and articles made therefrom. More particularly, the present invention relates to thermoplastic starch compositions that include a particulate filler component. The thermoplastic starch compositions may optionally include one or more additional thermoplastic polymers blended therewith and fibers for reinforcement.

2. The Relevant Technology

A. Sheets, Containers, and Other Articles Made From Paper, Plastic, Glass and Metal.

Materials such as paper, paperboard, plastic, polystyrene, and metals are presently used in enormous quantity as printed materials, labels, mats, and in the manufacture of other articles such as containers, separators, dividers, envelopes, lids, tops, cans, and other packaging materials. Advanced processing and packaging techniques presently allow an enormous variety of liquid and solid goods to be stored, packaged, or shipped while being protected from harmful elements.

Containers and other packaging materials protect goods from environmental influences and distribution damage, particularly from chemical and physical influences. Packaging helps protect an enormous variety of goods from gases, moisture, light, microorganisms, vermin, physical shock, crushing forces, vibration, leaking, or spilling. Some packaging materials also provide a medium for the dissemination of information to the consumer, such as the origin of manufacture, contents, advertising, instructions, brand identification, and pricing.

Typically, most containers and cups (including disposable containers) are made from paper, paperboard, plastic, polystyrene, glass and metal materials. Each year over 100 billion aluminum cans, billions of glass bottles and thousands of tons of paper and plastic are used in storing and dispensing soft drinks, juices, processed foods, grains, beer, etc. Outside of the food and beverage industry, packaging containers (and especially disposable containers made from such materials are ubiquitous. Paper for printing, writing, and photocopying, as well as magazines, newspapers, books, wrappers, and other flat items made primarily from tree derived paper sheets are also manufactured each year in enormous quantities. In the United States alone, approximately 5½ million tons of paper are consumed each year for packaging purposes, which represents only about 15% of the total annual domestic paper production.

Recently there has been a debate as to which of these materials (e.g., paper, paperboard, plastic, polystyrene, or metal) is most damaging to the environment. Consciousness-raising organizations have convinced many people to substitute one material for another in order to be more environmentally "correct." The debate often misses the point that each of these materials has its own unique environmental weaknesses. One material may appear superior to another when viewed in light of a particular environmental problem, while ignoring different, often larger, problems associated with the supposedly preferred material (e.g., whereas paper is more biodegradable than plastics and polystyrene, paper is far more polluting to the environment to manufacture).

The debate should not be directed to which of these materials is more or less harmful to the environment, but rather toward asking whether an alternative material can be developed which will solve most, if not all, of the various environmental problems associated with each of these presently used materials.

B. Starch.

Starch is a plentiful, inexpensive and renewable material that is found in a large variety of plant sources, such as grains, tubers, fruits, and the like. In many cases, starch is discarded as an unwanted byproduct of food processing. However, because starch is readily biodegradable it does not persist in the environment as a harmful material when disposed of. Perhaps the only harm that starch might cause is that it can put unwanted nutrients into the water or soil into which it is discarded, which could attract and facilitate the proliferation of certain unwanted organisms. It is this quality as a nutrient, though, that greatly facilitates the breakdown and elimination of starch from the environment.

Because of the biodegradable nature of starch many have attempted to incorporate starch into a variety of materials in order to improve the environmental desirability of such materials. Starch has been incorporated into multi-component compositions in various forms, including as a filler, binder, or as a constituent within thermoplastic polymer blends. In addition, some have attempted to utilize starch alone as a thermoplastic material, although with limited success due to the tendency of starch to form retrograde crystallization products upon resolidifying, which crystallization products often lack appropriate mechanical properties.

Starch may be added as an inert filler, typically in its native, unmodified state, which is a generally water-insoluble, granular material. In such cases, the starch granules will normally behave as any other solid particulate filler and will contribute little, if any, in terms of improving the mechanical properties of the resulting material. Alternatively, starch that has been gelatinized, dried, and then ground into a powder may also be added as a particulate filler. Although starch may be added as a filler, its more interesting and technologically challenging uses have been in the area of using starch as a binder, as a thermoplastically processible constituent within thermoplastic polymer blends, and as a thermoplastic material by itself.

Although the alternative uses of starch as a water-soluble binder or as a thermoplastic material generally require significantly different compositional formulations and process conditions in order to successfully process them as intended, they have the common requirement that the native starch granules must in some way be transformed or altered from being in a granular or particulate state to being in a molten or plastic state, such as be dissolution or gelation within a solvent or by being heated to form a starch melt. Because native starch has a melting point that approaches the decomposition temperature, it is virtually impossible to form a starch melt without the addition of plasticizers, solvents or other components that allow the starch to become molten, solvated or otherwise liquified into a plastic state at a temperature that is safely below the decomposition temperature.

Starch can be used as a "binder" in order to glue or otherwise adhere other solid constituents together to form a heterogenous mixture of different components. At some point before or during the molding phase, the starch is typically dissolved or gelatinized in an appropriate solvent, such as water, in order for it to become a liquid or gel. This allows the initially granular starch to become a flowable or plastic material into which the other components can be dispersed. Upon resolidification of the gelatinized starch, typically by removing enough of the water by evaporation so that the starch recrystallizes or otherwise dries out, the starch forms a solid or semi-solid binding matrix that can bind the remaining components together. Examples of patents that teach the use of starch as a binder and, in particular, processes for molding articles from aqueous starch mixtures include U.S. Pat. No. 5,660,900 to Andersen et al.; U.S. Pat. No. 5,683,772 to Andersen et al.; U.S. Pat. No. 5,709,827 to Andersen et al.; U.S. Pat. No. 5,868,824; and U.S. Pat. No. 5,376,320 to Tiefenbacher et al. For purposes of disclosing compositions, methods, and systems for molding aqueous starch mixtures that are subsequently dried so as to form a binding matrix of dried starch which binds together discrete solid materials such as fibers and/or particulate fillers, the foregoing patents are incorporated herein by specific reference.

Related to the process of molding aqueous starch mixtures is the formation of sheets having properties similar to conventional paper and paperboard by methods that do not require the use and subsequent removal of the huge quantities of water required in conventional paper-making processes. Examples of compositions, processes, and systems; for continuously manufacturing sheets from aqueous starch-based mixtures in a manner that does not utilize conventional drainage or dewatering are set forth in U.S. Pat. No. 5,736,209 to Andersen et al. and U.S. Pat. No. 5,810,961. For purposes of disclosing composition, methods and systems for the formation of sheets from aqueous starch-based mixtures, the foregoing patents are incorporated herein by specific reference.

Many have also attempted to use starch as a thermoplastic material, either alone or as a component within thermoplastic blends. Native starch does not typically behave as a thermoplastic material by itself but must be heated in the presence of some kind of plasticizer. Typically, the plasticizer must be a liquid (at least when raised to the resulting chemically compatible with starch, which is itself highly polar due to the existence of hydroxyl groups on approximately half of the carbon atoms. Typically, plasticizers used to assist the formation of starch melts have been either highly volatile liquids at the melting point, such as water, or low volatile liquids, such as glycerin.

Starch melts using water as the plasticizing solvent have been referred in the art as "destructurized starch". Starch is said to be "destructurized" because it ceases to be a solid granular particulate as found in its native state. Moreover, it is said to be "destructurized" because the dissolution or melting of starch in the presence of water is an irreversible process. Starch that has been dissolved into or melted in the presence of water can never return to its native, granular state. Upon resolidification of a melt of destructurized starch, typically by cooling below its melting or softening point, it will yield an essentially amorphous or semicrystalline starch material that is self-supporting or "form stable", but only so long as the water content is kept above at least 5% by weight of the starch and water mixture during the entire process including during cooling, preferably above at least 10%. Otherwise, the starch will tend to recrystallize into a brittle material instead of forming a more amorphous and less brittle solid.

The use of "destructurized starch" as a commercial thermoplastic material has been limited for a number of reasons, including difficulty in processing, poor long term mechanical properties, high sensitivity to fluctuations in ambient moisture, including poor dimensional stability, and the difficulty of forming homogeneous blends of destructurized starch with more hydrophobic polymers that are less sensitive to fluctuations in moisture. Examples of patents that disclose the manufacture of "destructurized starch" and blends of destructurized starch and other polymers include U.S. Pat. No. 4,673,438 to Wittwer et al.; U.S. Pat. No. 4,900,361 to Sachetto et al.; U.S. Pat. No. 5,095,054 to Lay et al.; U.S. Pat. No. 5,256,711 to Tokiwa et al.; U.S. Pat. No. 5,275,774 to Bahr et al.; U.S. Pat. No. 5,382,611 to Stepto et al; U.S. Pat. No. 5,405,564 to Stepto et al.; and U.S. Pat. No. 5,427,614 to Wittwer et al. For purposes of disclosing compositions and methods for manufacturing "destructurized starch" compositions, including blends of "destructurized starch" and other polymers, the foregoing patents are incorporated herein by specific reference.

Others have taught that it is preferable to greatly reduce the amount of water in starch melts by replacing the water inherently found in starch with an appropriate low volatile plasticizer capable of causing starch to form a thermoplastic melt below its decomposition temperature, such as glycerin, polyalkylene oxides, mono- and diacetates of glycerin, sorbitol, other sugar alcohols, and citrates. This allows for improved processability, greater mechanical strength, better dimensional stability over time, and greater ease in blending the starch melt with other polymers compared to "destructurized starch". Thermoplastic starch materials in which most or all of the water has been replaced by a low volatile plasticizer, either before or during processing, have been variously referred to as "thermoplastically processible starch" and "thermoplastic starch".

Water can be removed before processing by using starch that has been predried so as to remove at least a portion of the natural water content. Alternatively, water can removed during processing by degassing or venting the molten mixture, such as by means of an extruder equipped with venting or degassing means. Examples of patents that teach the manufacture of thermoplastically processible starch, including blends of thermoplastic starch and other polymers, include U.S. Pat. No. 5,362,777 to Tomka; U.S. Pat. No. 5,314,934 to Tomka; U.S. Pat. No. 5,280,055 to Tomka; U.S. Pat. No. 5,415,827 to Tomka; U.S. Pat. No. 5,525,281 to Lörcks et al.; U.S. Pat. No. 5,663,216 to Tomka; U.S. Pat. No. 5,705,536 to Tomka; U.S. Pat. No. 5,770,137 to Lörcks et al.; and U.S. Pat. No. 5,844,023 to Tomka. For purposes of disclosing compositions and methods for the manufacture of thermoplastic starch compositions, blends thereof, and articles of manufacture therefrom, the foregoing patents are incorporated herein by specific reference.

Still others have manufactured thermoplastic starch blends in which native starch is initially blended with a small quantity of water together and a less volatile plasticizer such as glycerin in order to form starch melts that are subjected to a degassing procedure prior to cooling and solidification in order to remove substantially all of the water therefrom. Examples of such patents include U.S. Pat. No. 5,412,005 to Bastioli et al.; U.S. Pat. No. 5,280,055 to Bastioli et al.; U.S. Pat. No. 5,288,765 to Bastioli et al.; U.S. Pat. No. 5,262,458 to Bastioli et al.; 5,462,980 to Bastioli et al.; and U.S. Pat. No. 5,512,378 to Bastioli et al.

Regardless of whether water or another plasticizer is used to form a starch melt, all destructurized and thermoplastic starch materials have been limited in the market place by the inherent mechanical limitations of starch melts and their relatively high cost. Although many have attempted for years to discover the "perfect" starch/polymer blend that would yield an environmentally sound polymer while, at the same time, fulfilling desired mechanical and cost criteria, such a combination has not yet been achieved. The reason for this is that the emphasis has been on finding the optimal synthetic polymer or mixture of synthetic polymers and other admixtures in order to thereby "optimize" the properties of the starch/polymer blend. One drawback is that most of the synthetic polymers and other admixtures are themselves significantly more expensive than starch, which tends to increase the cost of such polymer blends compared to starch melts. Another drawback is that such additives will only be able to marginally alter the mechanical properties of the starch/polymer blends when viewed from a materials science perspective.

In spite of the inherent economic limitations associated with thermoplastic starch blends, the focus of researchers has remained rigidly fixed on the goal of finding the "perfect" thermoplastic polymer or other admixture that will yield the "perfect" starch-polymer blend. Although extremely inexpensive fillers such as naturally occurring mineral materials have been added to concrete and other building materials, their use as an inexpensive filler within destructurized or thermoplastic starch systems has been largely ignored. Although the aforementioned U.S. Pat. No. 5,362,777 to Tomka discloses the inclusion of an inorganic filler, such filler component is limited to concentrations of 3% or less by weight. Likewise, the aforementioned U.S. Pat. No. 5,427,614 to Wittwer et al. discloses the use of an inorganic "texturizing agent" having a concentration of 1% or less. At such low concentrations, inorganic fillers will only have a marginal impact on the cost and mechanical characteristics of the thermoplastic or destructurized starch materials disclosed therein.

Based on the foregoing, what are needed are improved thermoplastic starch compositions and methods for manufacturing low cost, environmentally friendly sheets, films, and molded articles having appropriate mechanical properties similar to, e.g., paper. paperboard, polystyrene, other plastics, metal sheets, and the like.

It would be a significant improvement in the art if such thermoplastic starch compositions allowed for the formation of a variety of containers or other articles using existing manufacturing equipment and techniques presently used to form articles from paper, polymer films, or moldable plastic materials.

It would yet be an advancement in the art if such environmentally friendly thermoplastic starch compositions could be formed from compositions that only included a fraction of the starch content compared to other starch-based compositions presently being utilized.

It would be a significant improvement in the art if such thermoplastic starch compositions yielded articles that were readily biodegradable and/or degradable into substances commonly found in the earth.

From a practical point of view, it would be a significant improvement to provide thermoplastic starch compositions and methods which allowed for the manufacture of sheets, containers, and other articles at a cost that was comparable to or even lower than the cost of existing methods of manufacturing articles from paper, plastics, or other materials.

It would be a further advancement in the art to provide thermoplastic starch compositions and methods which allowed for the inclusion of less organic polymer materials while overcoming many of the problems associated with compositions based on starch melts.

It would also be a tremendous advancement in the art to provide thermoplastic starch compositions and methods which allowed for the inclusion of significant quantities of an inorganic filler and, optionally fibrous materials, both organic and inorganic, within such starch compositions.

In addition, it would be an advancement in the art to provide thermoplastic starch compositions that had improved physical properties, such as increased thermal stability, increased modulus of elasticity, compressive strength, and toughness compared to conventional thermoplastic starch compositions.

Such thermoplastic starch compositions and methods for manufacturing starch-based sheets, films articles therefrom, and molded articles are disclosed and claimed herein.

SUMMARY AND OBJECTS OF THE INVENTION

The present invention is directed to compositions and methods for manufacturing thermoplastic starch compositions having a particulate filler and, optionally, fiber-reinforcement. Such "thermoplastic starch compositions" having a particulate filler can be shaped into a wide variety of articles of manufacture in a manner similar to conventional thermoplastic materials.

The raw material that is used to make the thermoplastic starch compositions of the present invention preferably comprises native, ungelatinized starch granules, although one or more starch derivatives may also be used, either alone or in combination with native starch. Native starch granules are made thermoplastic by mixing and heating in the presence of an appropriate plasticizer to form a starch melt The starch melt is then blended with on, or more non-starch materials in order to improve the properties and/or reduce the cost of the resulting thermoplastic starch composition. At a minimum, a particulate filler component is blended with the starch melt, preferably an inexpensive, naturally occurring mineral particulate filler ("inorganic filler"). In order to increase the tensile strength and other desirable mechanical properties of the starch/filler blend, other admixtures such as fibers, one or more synthetic polymers, cross-linking agents, softening agents, and the like may be included within the thermoplastic starch compositions.

In order to create the necessary conditions required to form a starch melt, the initially solid starch granules are mixed at high shear together with an appropriate admixture, such as a lower volatile plasticizer or a more volatile plasticizing solvent, at a temperature and pressure sufficient to form the starch melt. In one embodiment, the starch and admixture are blended within the barrel of a screw or auger extruder. The extruder is heated and the screw auger within the extruder barrel is rotated in order to heat and blend the starch and plasticizer together under relatively high shear conditions to thereby cause the starch to form a melt. Because the melting point of native starch normally approaches decomposition temperature, it is necessary to melt native starch in the presence of a plasticizing admixture in order to form a workable and plastic starch melt at a temperature below the decomposition temperature. In the case where a low volatile plasticizer is used, i.e., one that has a vapor pressure of less than about 1 bar when heated to the melt temperature of the starch, it may be possible to use any appropriate high shear mixing apparatus, such as a high speed food mixer. However, in the case where a more volatile plasticizing solvent such as water is used, and where the melting point of the starch will cause the more volatile plasticizing solvent to rapidly vaporize, it may be necessary to maintain enough internal pressure, such as within an extruder barrel, to keep the plasticizer from violently expanding and impeding the process of forming the starch melt. Some or all of the volatile plasticizing solvent may be removed by venting.

Before, during or after the formation of the starch melt, appropriate additives may be blended with the starch melt. The resulting thermoplastic starch composition is either extruded or otherwise formed into appropriately sized beads, granules, or other storable and feedable materials, or else it is immediately shaped into the desired article, such as sheets, films, or molded articles. In many cases, methods and apparatus commonly used in the plastics industry may be employed with only modest, or even no, modification in some cases.

The molten thermoplastic starch compositions are caused to solidify by cooling to below their softening or melting point. The terms "softening point" or "melting point" shall refer to the temperature or temperature range above which a particular thermoplastic starch composition is sufficiently plastic and flowable such that it can be molded or formed into a desired shape, and below which the composition solidifies to the point of being approximately form stable or self-supporting. The quantity of plasticizer or other admixtures can be adjusted to yield thermoplastic starch compositions having a softening or melting point greater than about 40° C. Preferably, the softening or melting point will be in a range from about 60° C. to about 240° C., more preferably in a range from about 80° C. to about 220° C., and most preferably in a range from about 100° C. to about 200° C.

Adding an inorganic filler material to the starch melt greatly decreases the cost and, in some cases, even improves the desired mechanical properties, of the thermoplastic starch compositions of the present invention. In order to increase the concentration of inorganic filler within a thermoplastic starch composition it will generally be desirable to increase the ratio of the volume of the inorganic filler compared to its surface area. Thus, it will generally be preferable to select inorganic filler particles in a manner that reduces their specific surface area. One way to do this is to select particles that have more uniform and less irregular surfaces. For example, spherical particles have a much lower surface area to volume ratio (i.e., lower specific surface area) than highly irregularly shaped particles. Another strategy for decreasing the specific surface area of particle system is to use larger particles that have a lower surface to volume ratio. Larger particles can also be blended with smaller particles to thereby allow the smaller particles to occupy the spaces between the larger particles, which increases the particle packing density of the particulate filler phase.

By selecting an inorganic filler that tends to minimize, or at least optimize, the specific surface area of the filler particles, it is possible to increase the quantity of inorganic filler that can be added to the thermoplastic starch compositions, while maintaining appropriate rheological characteristics of the starch melt during molding and also maximizing the strength of the final solidified thermoplastic starch composition. The reason for this is that particles having lower specific surface area have a lower overall surface that must come into contact with the thermoplastic starch melt, which allows for more efficient use of the binder. Moreover, the use of particle packing techniques further allows for more efficient use of the thermoplastic starch melt since the spaces that would otherwise be occupied entirely by the starch melt will instead be occupied in large measure by the smaller filler particles. Increasing the particle packing density generally increases the amount of inorganic filler that may be added while reducing the negative impact on the rheological and mechanical properties of the composition.

In view of the foregoing, it is now possible to manufacture highly inorganically filled thermoplastic starch compositions having improved mechanical properties. Of equal or greater importance is the fact that space or volume once occupied by the relatively expensive thermoplastic starch binder can now be occupied by the generally far less expensive inorganic filler component to thereby yield a final thermoplastic starch composition having a greatly reduced volume-to-cost (or mass-to-cost) ratio.

In general, the inorganic filler may be included within the thermoplastic starch compositions of the present invention in a broad range from about 5% by volume up to about 90% by volume of the thermoplastic starch composition. Depending on the specific gravity of the inorganic filler, the filler may be included in an amount in a range from about 5% to about 95% by weight of the thermoplastic starch compositions of the invention. In order for the filler to significantly reduce the cost of the thermoplastic starch composition, the inorganic filler will preferably be included in an amount greater than about 15% by weight of the thermoplastic starch composition, more preferably in an amount greater than about 25% by weight, more especially preferably in an amount greater than about 35% by weight, and most preferably in an amount greater than about 50% by weight.

In some cases, it may be desirable to include a fibrous material as a reinforcing component in order to improve the strength properties of the final thermoplastic starch compositions. In general, fibers tend to increase the tensile strength, toughness, and fracture energy of the resulting thermoplastic starch compositions. Although fibers are generally difficult to disperse within liquids unless the liquid is included in an overwhelmingly high proportion compared to the fibers, fibers may in fact be blended within the thermoplastic starch compositions of the present invention due to the shearing action to which the starch will typically be exposed during the melt process. In addition, because starch melts typically have a fairly high viscosity, they are able to efficiently transfer the shearing forces from the mixing apparatus down to the fiber level in order to separate the fibers and keep them from agglomerating together, as might occur by mixing fibers using a nonviscous, Newtonian fluid such as water.

In order to maximize the strength properties that may be imparted by the fibrous material, it will generally be preferable to include fibers having a relatively high aspect ratio, typically greater than about 10:1, preferably greater than about 25:1, more preferably greater than about 100:1 and most preferably greater than about 250:1. Examples of useful fiber; include those derived from wood, plant sources, mineral fibers, and polymer fibers.

Nevertheless, it may be desirable to add particulate fibrous fillers that may behave in a similar fashion to inorganic mineral fillers. Such particulate fibrous materials include, for example, sawdust, wood flour, waste bran materials from grain processing, and other generally inexpensive and plentiful fibrous particulates. One advantage of fibrous particulates is the fact that they comprise cellulose, which is chemically similar to starch and which would therefore be generally very compatible with the starch binder. Within the scope of fibrous materials that could be included would be flakes or flake-like materials, such as metallic flakes.

The fibrous material may include filaments, fabrics, mesh or mats that are coextruded, or otherwise impregnated, with the thermoplastic starch compositions of the present invention.

In order to improve the strength and other mechanical properties of the thermoplastic starch compositions of the present invention, the fibrous material may be included in a broad range from 0% to about 90% by weight of the thermoplastic starch-based composition. Preferably, the fibrous material will be included in an amount in a range from about 3% to about 80% by weight, more preferably in a range from about 5% to about 60%, and most preferably in a range from about 10% to about 30% by weight of the thermoplastic starch compositions.

It may also be preferable in many cases to blend one or more other thermoplastic polymers with the starch melts in order to form a starch/polymer blend. Such other thermoplastic polymers may be added in order to improve the mechanical properties of the thermoplastic starch compositions, reduce the sensitivity of such materials to fluctuations in ambient moisture, make such materials more water impermeable, increase the strength and improve other mechanical properties of the resulting thermoplastic starch compositions, and/or assist in preventing the formation of retrograde starch crystallization products upon solidification.

The thermoplastic starch materials of the present invention may include a wide variety of different components that can impart greatly varying mechanical and other properties to the final thermoplastic starch compositions. Therefore, based on the teachings of the disclosure, one of ordinary skill in the art will be able to design a thermoplastic starch composition having any one of a wide variety of mechanical, chemical, or other properties in order to satisfy the design criteria of the final articles to be manufactured from the thermoplastic starch compositions. More particularly, based on the present disclosure, one of ordinary skill in the art will be able to select from among the various components in order to maximize the desired mechanical properties while minimizing the cost of the thermoplastic starch compositions of the present invention.

Virtually any thermoplastic material may be blended with a starch melt in order to form the thermoplastic starch compositions of the present invention. Nevertheless, preferred polymers include synthetic or naturally derived polymers that are sufficiently compatible with starch in order to form a substantially homogeneously blended starch/polymer mixture. Increasing the homogeneous nature of the starch/polymer blends will tend to create a material having more uniformly and predictably distributed mechanical properties throughout the material. More preferred synthetic polymers include those that are able to react with and form mechanical bonds with at least a portion of the starch molecules within the melt. Obviously, reacting the synthetic polymer with the starch will, by definition, form a more homogeneous final thermoplastic starch composition.

Due to the fact that the reaction sites located along the starch molecular chain are hydroxyl groups, the most likely reaction between starch and a synthetic polymer will involve some kind of reaction between the hydroxyl groups and the synthetic polymer, including but not limited to esterification, etherification, substitution, the formation of acetals or ketals, and the like. Because the existence of substantial quantities of water will tend to inhibit condensation reactions or cross-condensation reactions (e.g., cross esterification) by driving the equilibrium toward hydrolysis, it will be preferable when utilizing synthetic polymers to be condensed or cross-condensed with the starch to eliminate excess water that could inhibit the condensation reactions. One way to do this is to use pre-dried starch, such as starch that has been dried by heating in order to drive off a significant portion of the water that naturally occurs in starch. Starch typically contains about 10–20% moisture by weight, which is preferably reduced to below about 10%, more preferably to below about 5% and most preferably to below about 3% by weight prior to forming the starch melt. Alternatively, the excess water can be removed from the starch melt by evaporation prior to or while blending the starch melt with the synthetic polymer. Finally, it may be preferable to vent, chemically or physically scavenge, or otherwise provide for the removal of water molecules that are released during heating to form the starch melt and/or that may be formed during condensation reactions in order to drive the equilibrium of the condensation reaction in the forward direction.

Once the thermoplastic starch compositions have been made, they can be stored as beads, granulates or other appropriate shapes. The thermoplastic starch beads, granulates, and the like, or a freshly prepared batch of a thermoplastic starch composition according to the invention, can be molded using any conventional molding means known in the art for shaping thermoplastics and other materials, including but not limited to die press molding, injection molding, blow molding, vacuum forming, rolling, extrusion, film blowing, laminating, coating, and the like.

Blowing or expansion agents may be included within the thermoplastic starch compositions so as to yield final molded articles that are foamed, or which otherwise include a substantial quantity of void spaces. For example, water may be used to yield a foamed composition in view of the operating temperatures. Fibers premoistened with water can provide the water for such expansion or foaming.

In light of the foregoing, it is an object of the present invention to provide improved thermoplastic starch compositions and methods for manufacturing low cost, environmentally friendly sheets, films, articles made therefrom, and molded articles having appropriate mechanical properties similar to, e.g., paper, paperboard, polystyrene, plastic, metal sheets, and the like.

It is another object of the present invention that such thermoplastic starch compositions allow for the formation of a variety of containers and other articles using existing manufacturing equipment and techniques presently used to form articles from paper, polymer films, or moldable plastic materials.

It is a further object of the present invention that such environmentally friendly thermoplastic starch compositions can be formed from compositions that only include a fraction of the starch content compared to other starch-based compositions presently being utilized.

It is yet an additional object that such compositions yield articles that are readily biodegradable and or degradable into substances commonly found on the earth.

It is a further object and feature to provide thermoplastic starch compositions and methods which allow for the manufacture of sheets, containers and other articles at a cost that is comparable to, or even lower than, the cost of existing methods of manufacturing articles from paper, plastics, or other materials.

It is yet another object to provide thermoplastic starch compositions and methods which allow for the inclusion of less organic polymer materials while overcoming many of the problems associated with conventional starch melts.

It is a further object to provide thermoplastic starch compositions and methods which allow for the inclusion of significant quantities of an inorganic filler and, optionally fibrous materials, either organic or inorganic, within such thermoplastic starch compositions.

It is an additional object and feature of the invention to provide thermoplastic starch compositions that have improved physical properties, such as increased thermal stability, increased modulus of elasticity, compressive strength, and toughness compared to conventional thermoplastic starch compositions.

These and other objects and features of the present invention will become more fully apparent from the following description and appended claims, or may be learned by the practice of the invention.

DETAILED DESCRIPTION OF THE PREFERRED EMBODIMENTS

I. Introduction and General Definitions

The present invention encompasses thermoplastic starch compositions that, at a minimum, include starch, a plasticizer, and an inorganic mineral filler. Such compositions may also include fibers, synthetic polymers, and other admixtures in order to impart desired properties to the composition while in a melt stage as well as the final resolidified composition and articles manufactured therefrom. The inorganically filled, thermoplastic starch compositions can be shaped into a wide variety of articles of manufacture much like conventional thermoplastic materials.

The thermoplastic starch compositions of the present invention can generally be described as comprising multi-component, multi-scale, micro-composites. By carefully incorporating a variety of different materials capable of imparting discrete, yet synergistically related, properties, it is possible to create a unique class or range of micro-composites having remarkable properties of strength, toughness, environmental soundness, mass-producibility, and low cost.

The term "multi-component" refers to the fact that the thermoplastic starch compositions typically include two or more chemically or physically distinct materials or phases, such as the binding matrix comprising, at a minimum, a starch melt formed by plasticizing starch with a plasticizer, a particulate filler and optional admixtures, such as fibers for reinforcement auxiliary polymers for added strength and water-resistance and void spaces for lightweight and/or insulation properties. Each of these broad categories of materials imparts one or more unique properties to the final thermoplastic starch compositions made therefrom, as well as to the sheets, films and other articles manufactured therefrom. Within these broad categories it is possible to further include different components such as, for example, two or more types of inorganic fillers, fibers, and synthetic organic polymers, which can impart different yet complementary properties to the inventive thermoplastic starch compositions. This allows for the specific engineering of desired properties within the final articles in conjunction with the manufacturing process.

The multi-component (and hence, multi-property) nature of the thermoplastic starch compositions of the present invention is a significant departure from conventional materials, such as plastic, polystyrene, paper, or metal, which are essentially single component systems. Sheets, films, or molded articles made from single component materials are generally limited to having the particular properties of the material from which they are made. For example, films or sheets that are brittle generally cannot be bent or folded without damaging the films or sheets, while films or sheets that are flexible are insufficiently rigid to provide other desired mechanical properties. In contrast, the multi-component nature of the materials of the present invention allows for the introduction of multiple and/or specially engineered properties to allow for the manufacture of an almost endless variety of articles from such thermoplastic starch compositions.

The term "multi-scale" refers to fact that the compositions and materials of the present invention are definable at different levels or scales. Specifically, within the thermoplastic starch compositions of the present invention there is typically a macro-component composition in the range from about 10 nanometers to as high as about 10 mm, a micro-component composition in the range of about 1 micron to about 100 microns, and a submicron component. Although these levels may not be fractal, they are usually very similar to each other, and homogeneous and uniform within each level.

In some cases, the materials may be reinforced with fibers. The term "fiber-reinforced" is self-explanatory, although the key term is "reinforced", which clearly distinguishes the compositions of the present invention from conventional paper or paper products. Conventional paper relies on "web" physics, or intertwining of fibers, to provide the structural matrix and mass, as well as the binding, of the paper. However, the binding matrix in the compositions of the present invention involves the interaction between The thermoplastic starch phase, inorganic mineral filler component, optional fibers, and other optional components. The fibers act primarily as a reinforcing component to specifically add tensile strength, toughness, and flexibility but are not joined together by web physics to any substantial degree.

Finally, the term "micro-composite" refers to the fact that the thermoplastic starch compositions are not merely a compound or mixture but a designed matrix of specific, discrete materials on a micro-level, which are of different sizes, shapes, and chemical make-up. The materials are sufficiently well bound and interactive so that the unique properties of each are fully evidenced in the final composite (e.g., the tensile strength of the composition has a direct correlation to the tensile strength of the fibers and thermoplastic starch phase).

In light of these definitions and principles, thermoplastic starch materials can be combined with inorganic fillers and other components and molded into a variety of products, including films, sheets, and molded articles having properties similar to those of conventional thermoplastic or paper materials. Articles made therefrom can substitute for articles made from paper, plastic, polystyrene, and even metal. Films and sheets can be cut and formed (such as by bending, folding or rolling) into a variety of containers and other articles of manufacture. The thermoplastic starch compositions of the invention, including sheets, films, or articles molded therefrom, are particularly useful in the mass production of disposable containers and other packaging material, such as used in the fast food industry.

A. Thermoplastic Materials

The term "thermoplastic materials" is understood in the art and used herein to denote compositions and materials that are generally capable of repeatedly softening when appropriately heated and hardening when subsequently cooled. "Thermoplastic materials" are generally in a solid or form stable state below the melting point or softening range, while generally being in a plastic or flowable state above the melting point or softening range. The term "solid" means that the material is sufficiently hardened, nonplastic or nonflowable such that it will substantially maintain its shape without external support. Of course, "solid" materials may have a degree of resilience, bendability or deformability and yet maintain their characteristic as being a "solid". As used in the specification and appended claims, the term "melting point" shall be understood to refer to both the discrete melting points of more crystalline polymers and the melting or softening ranges of more amorphous polymers, unless otherwise specified.

The terms "plastic" and "flowable" are used in conjunction with materials that can be molded or otherwise shaped or deformed without causing significant damage to the structural matrix of the material upon resolidification. Thus, while a solid material may be bent or otherwise deformed, there is a point after which further movement or deformation could cause the structural matrix to rupture, crack, or otherwise weaken irreversibly. Plastic or flowable materials, on the other hand, are characterized as being able to be shaped and deformed as desired while yielding a final solidified article having the same general strength properties upon solidification regardless of the degree of deformation while in a plastic state when normalized for variables such as thickness, size, shape, texture, molecular orientations, and the like. One of ordinary skill in the art will generally know by observation and experience whether a given thermoplastic material should considered to be a "solid" or "nonplastic" on the one hand or "plastic" or "flowable".

A thermoplastic material is characterized in that it may be shaped into a desired article by first heating the material to a temperature above its melting point or softening range to form a flowable or plastic melt. The thermoplastic melt may then be shaped into a desired article. Thereafter, or substantially at the same time of shaping, the shaped material is cooled sufficiently to cause it to harden or solidify and thereby form the desired article or intermediate material. The intermediate material may be further shaped or manipulated by reheating it to form a melt phase and then cooling to resolidify the shaped material.

The degree of crystallinity can affect whether or not a thermoplastic polymer has at distinct or abrupt melting point. In general, the more crystalline a polymer is, the more distinct will be its melting point. Conversely, more amorphous polymers tend to soften, melt and solidify over a range of temperatures. Thus, amorphous polymers do not have a distinct melting point but rather a softening or melting range. Because of this, more amorphous polymers have greater "melt stability". That is, they can be melted and then shaped under conditions of high shear and pressure over a relatively broad range of temperatures without abruptly solidifying like more crystalline polymers. The softening or melting range generally becomes even broader as variability in the molecular weight of the individual polymer chains increases, which tends to further inhibit crystallization of the polymer molecules.

The temperature at which a more amorphous polymer becomes soft enough to be shaped is generally significantly lower than the melting point of a more crystalline form of the same polymer. In other words, the softening or melting range of a more amorphous polymer may be substantially lower than the melting point of a more crystalline form of the same polymer. Thus, more amorphous polymers can often be shaped at lower temperatures compared to similar polymers that are more crystalline. Conversely, more crystalline polymers may solidify more abruptly when cooled to below the melting point but will also exhibit greater dimensional stability when subsequently subjected to heat. More amorphous polymers tend to have greater flexibility and bending endurance while more crystalline polymers are more rigid and have a greater Young's modulus.

Because more crystalline polymers have a more abrupt melting point above which the polymer is plastic and flowable and below which the polymer is a crystalline solid, further cooling of a crystalline polymer below its melting point will typically cause only minor incremental changes in its physical properties, if at all. On the other hand, more amorphous polymers, in addition to having a softening range, have what is known in the art as a "glass transition temperature" somewhere below the softening point or melt temperature at which they first become solid and dimensionally stable. Below the glass transition, temperature, amorphous polymers become considerably more rigid and brittle, while above this temperature they tend to be increasingly flexible and elastic. Thus, amorphous polymer exhibit greater dimensional stability and have increased modulus of elasticity below the glass, transition temperature. Conversely, they are more flexible, pliable and elastic above the glass transition temperature, although they may still have sufficient dimensional stability and resilience so as to be considered to be a "solid". Although the glass transition temperature is often reported as a single value, it is known that the glass transition may actually occur over a temperature range and it is attributed a kinetic meaning.

In some cases it may be possible to control the degree of crystallinity of a polymer by the manner in which a polymer melt is cooled. Cooling the polymer melt gradually as the temperature approaches the melting or softening point will increase the tendency of the polymer to become more crystalline. This is because slowly cooling the polymer allows the individual molecules to reorder themselves into more of a crystalline structure before the polymer actually becomes solid. Conversely, cooling a polymer melt more rapidly tends to maintain the polymer in a less crystalline and more amorphous state by quickly "freezing" (sometimes referred to as "quenching") the individual molecules in a more random state before they have an opportunity to arrange themselves into a more crystalline structure.

In general, the term "thermoplastic material" is distinguished from "thermoset materials", which generally cannot generally be resoftened by reheating once they have been set into a permanent shape by heating or by the action of heat and pressure. Nevertheless, in the context of the present invention, it should be understood that the term "thermoplastic materials" may include a fraction of some materials which, by themselves, are not necessarily completely remeltable once solidified following initial melting, although in most cases the overall thermoplastic starch materials will exhibit classic thermoplastic behavior.

The term "thermoplastic starch composition", as used in the specification and the appended claims, is broadly defined to include any thermoplastic composition or blend having thermoplastic starch as a constituent. The only other limitation of the term "thermoplastic starch composition" within the context of the present invention is that the composition will include a filler component as a discrete phase that is dispersed throughout the thermoplastic phase. Hence, the term "thermoplastic starch composition" is limited to those thermoplastic starch materials that include the aforementioned filler. The filler component may include an organic filler, an inorganic filler, or both. In its broadest sense, the term "filler" may include both fibrous materials and particulate particles. The thermoplastic starch compositions may also optionally include other polymer materials for altering the properties of the thermoplastic phase, cross-linking agents, phase mediators, softeners, humectants, and other admixtures for engineering desired properties into the final thermoplastic starch composition.

Because native starch is generally incapable of behaving as a thermoplastic material by itself, or by itself in combination with a particulate filler, it will generally be understood that the starch melt component will further include some kind of melt-initiating agent that can cause the starch to behave in a thermoplastic manner. In order to distinguish the thermoplastic starch component from the overall thermoplastic starch composition, the terms "thermoplastic starch" or "thermoplastic starch component" shall refer to the fraction of the overall thermoplastic starch composition comprising a starch melt. The term "starch melt" shall be broadly understood to include starches that are in a molten state, as well as starch materials that have previously undergone a melt but that have subsequently become solidified. Thus, the term "starch melt" shall be synonymous with any thermoplastically processible starch material, whether in a molten or solid state, that was originally formed by melting starch in the presence of a plasticizer.

Both low volatile plasticizers having a vapor pressure of less than 1 bar at the melt temperature of the thermoplastic starch composition (e.g., glycerin and sorbitol) and volatile solvents having a vapor pressure greater than 1 bar at the melt temperature (e.g., water) fall within the general classification of "plasticizers" and "melt initiation agents".

The thermoplastic starch compositions comprise a heterogeneous, though a preferably homogeneously mixed, mixture of at least two discrete phases, namely a thermoplastic phase, a solid filler phase, and other optional phases. The thermoplastic phase will typically comprise starch, a plasticizer, and optionally one or more other polymer materials or liquids that can be mixed or interspersed sufficiently with the starch so as to essentially constitute a single "thermoplastic phase". The thermoplastic phase, whether a homogeneous material or a heterogeneous blend of hydrophobic and hydrophilic thermoplastic phases, is characterized as generally being capable of forming a melt by heating to above a temperature, a temperature range, or a series of temperatures or temperature ranges and then resolidifying when cooled sufficiently. As such, the thermoplastic phase is able to first become molten and then resolidified in order to bind the other components or phases together.

The solid filler phase, on the other hand, will typically comprise a plurality of individual particles or fibers dispersed throughout the thermoplastic phase that themselves will not generally undergo a phase change to form a melt. Instead, the filler phase will remain as a discrete discontinuous solid phase interspersed throughout and among the continuous thermoplastic phase. Although it is possible for the filler to also interact with the thermoplastic phase, the filler will generally not assist in binding the components together. The solid filler phase will typically include discrete particles, such as inorganic particles.

Other discrete phases may include a fibrous phase, comprising either organic or inorganic fibers, an organic filler phase comprising organic particles, and other organic or inorganic materials that may be in any state such as solid, gel, liquid, or gas and which for some reason do not become substantially commingled with the thermoplastic phase so as to be considered part of that phase. Because each of the materials within any of the phases in the thermoplastic starch compositions can be selected to impart a unique property to the overall material, it will be possible to microstructurally engineer a thermoplastic starch material best suited for a particular use based on given performance criteria of e.g., cost, strength, durability, degradability, esthetic appeal, density, flexibility, and the like.

B. Sheets, Films, Containers, and Other Articles Made From Thermoplastics Starch Compositions The term "sheet" as used in this specification and the appended claims is intended to include any substantially flat, corrugated, curved, bent, or textured sheet made using the thermoplastic starch compositions and methods described herein. The only essential compositional limitation is that the binding matrix, or thermoplastic phase, comprise starch that has been processed to form a thermoplastic starch melt prior or during the sheet-making process. The sheets may also include organic coatings, printing, other sheets laminated thereto, etc. The sheets within the scope of the present invention can have greatly varying thicknesses depending on the particular applications for which the sheets are intended. The sheets can be as thin as about 0.001 mm or as thick as 1 cm or greater where strength, durability, and or bulk are important considerations.

The term "film" is not inherently differentiating from the term "sheet" except that "film" normally denotes a very thin sheet. Films are often formed by processes that are different from how sheets are normally formed, such as by film blowing rather than sheet calendering. In general, films will be defined as sheet-like articles having thicknesses as low as about 1 micron and up to about 1 mm.

The term "molded article" shall refer to articles that are shaped directly or indirectly from thermoplastic starch compositions using any molding method known in the art for thermoplastic materials. Articles formed by melting and remolding intermediate sheets are also "molded articles" within this definition.

The term "converted article" shall refer to articles that are shaped from sheets, films, or other articles made from thermoplastic starch compositions without a complete remelting step. An example of a "converted article" is a box that is made by cutting, bending, and then gluing a sheet formed from a thermoplastic starch composition of the present invention. Of course, some spot thermoplastic adhesion may be possible to adhere a thermoplastic sheet to itself or another sheet or article without the need to apply a separate adhesive.

The term "container" as used in this specification and the appended claims is intended to include any article, receptacle, or vessel utilized for storing, dispensing, packaging, portioning, or shipping various types of products or objects (including, but not limited to, food and beverage products). Specific examples of such containers are set forth in detail below and include, among others, boxes, cups, "clam shells," jars, bottles, plates, bowls, trays, cartons, cases, crates, cereal boxes, frozen food boxes, milk cartons, bags, sacks, carriers for beverage containers, dishes, egg cartons, lids, straws, envelopes, or other types of holders.

In addition to integrally formed containers, containment products used in conjunction with containers are also intended to be included within the term "container." Such articles include, for example, lids, liners, straws, partitions, wrappers, cushioning materials, utensils, and any other product used in packaging, storing, shipping, portioning, serving, or dispensing an object within a container.

An advantage of the thermoplastic starch compositions of the present invention (as well as containers, films, printed materials, or other articles made therefrom) is that their disposal impacts the environment far less than paper, paperboard, plastic, polystyrene, glass, or metal products. The sheets and articles of the present invention are both readily recyclable and, even if not recycled, will readily degrade and decompose when exposed to moisture, pressure, and other environmental forces into components that are complementary to the components of the earth. The starch component will dissolve slowly in water and will then be quickly degraded by microbial action. Many synthetic polymers are also biodegradable. Organic fillers and fibers may also be biodegradable and are included in far lesser amounts to begin with compared to paper. The inorganic filler is inert and will be generally compatible with the earth.

II. Phases and Components
A. Thermoplastic Phase

The terms "phase" and "phases", when used in context with the thermoplastic compositions of the present invention, shall refer to the discrete layers or compositional discontinuities within the thermoplastic starch composition. The term "physical state" shall be used to refer to whether a material is a gas, liquid or solid.

The term "thermoplastic phase" is so defined because its plasticity, or ability to flow and be deformed, changes as a function of temperature. When heated sufficiently it flows, and when cooled sufficiently it become substantially solidified. The thermoplastic phase will be in a substantially solid state when cooled sufficiently below its melting point or softening range, and in a substantially liquid or semi-liquid state when heated sufficiently above the melting point or softening range. In general, whether the overall thermoplastic starch compositions are plastic or solid will usually be determined by the physical state of the thermoplastic phase and not the other phases dispersed therein. Thus, when the thermoplastic phase is heated to become plastic, the overall thermoplastic starch composition will itself behave in a substantially plastic manner so that it may be shaped into a desired article of manufacture, even though it may contain solid particles or fibers dispersed therein. Similarly, when the thermoplastic phase is thereafter cooled sufficiently so that it becomes resolidified, the overall thermoplastic starch composition will behave as a solid rather than a flowable material, though it is possible for flowable liquids to remain encapsulated within the substantially solidified composition.

In contrast to the thermoplastic phase, the solid phases and optional gaseous phases, dispersed throughout the thermoplastic phase may not themselves undergo any change of physical state change during processing and molding. Nevertheless, because the solid phase and optional gaseous phases are generally disperse phases comprised of discontinuous particles or bubbles, they may generally be considered to be passive constituents within the thermoplastic phase matrix, although these particles and bubbles will often affect the physical and mechanical properties of the thermoplastic starch compositions. Because the solid and optional gaseous phases comprise relatively small particles or spaces within the continuous thermoplastic phase, the overall thermoplastic starch composition can act as either a solid or flowable material on a macro level though it may contain dispersed materials having different physical states on a micro level.

The thermoplastic phase will also act as a binding matrix that will encapsulate the other phases and hold them together when the thermoplastic phases is in a solid state. Nevertheless, it should be understood that the other phases dispersed throughout the thermoplastic phase will often interact with the thermoplastic phase, both mechanically and chemically, in many cases. Some phases may simply act as passive constituents that interrupt the thermoplastic phase, while other phases may actually strengthen the composition by forming mechanical and/or chemical links between different regions of the composition on a macroscopic level. Other phases may primarily affect the density, flexibility, texture, and esthetic appearance of the composition rather than strength. In order to obtain the most beneficial effects from the various phases and components within the thermoplastic starch compositions, one of ordinary skill can select the components within the thermoplastic phase that will maximize the synergistic effect between the various components in order to provide the best mechanical properties at the least cost. This process of properly selecting components having the best synergistic interaction may be referred to as "microstructural engineering".

The thermoplastic phase will, at a minimum, include starch and a plasticizer that is capable of causing the starch to behave as a thermoplastic material that can form a melt when heated rather than thermally decomposing. The thermoplastic phase may also include one or more additional constituents that can improve the mechanical and/or chemical properties of the thermoplastic phase. In many cases, one or more additional thermoplastic polymers can be added, such as a hydrophobic biodegradable polymer that will make the overall thermoplastic starch composition less sensitive to fluctuations in ambient moisture. In addition, or in lieu of additional polymers, the thermoplastic phase may include substances that chemically react with or physically associate with the starch in order to impart desired properties of e.g., strength and resistance to fluctuations in moisture, such as cross-linking agents, softeners, sealers, phase mediators or humectants. Still other constituents within the thermoplastic phase may simply be solids, liquid, or gases that are dissolved or otherwise mixed throughout the thermoplastic phase in a manner such that they are not thereafter identifiable as a phase that is significantly distinct from the thermoplastic phase.

In the case where the thermoplastic phase includes a synthetic or natural polymer in addition to the thermoplastic starch fraction, the thermoplastic phase will often contain two or more thermoplastic subphases that are preferably substantially homogeneously mixed together but which nevertheless may constitute distinct subphases at the microscopic level. In a mixture of polymers, the polymer chains of one type of polymer will tend to associate with themselves rather than with the polymer chains of another type of polymer. In many cases, the two or more polymers will have varying degrees of hydrophilicity or hydrophobicity, giving them varying degrees of chemical compatibility. Just like water and oil, which are generally immiscible in each other and which tend to separate into distinct phases, so too will more hydrophilic polymers tend to resist blending with more hydrophobic polymers. Nevertheless, just like water and oil, which can be temporarily blended together through vigorous mixing conditions, so too can different polymers be blended together using high shear mixing conditions when heated to become thermoplastic and, hence, Theologically compatible. Upon cooling to resolidify the thermoplastic subphases, the polymers will remain mechanically mixed together in either a solution, as an interpenetrating network of polymeric subphases, or a combination of the two. Whereas water and oil will tend to separate into distinct phases over time, solidification of the blended polymers will, in essence, mechanically interlock the two or more different polymer subphases and prevent them from separating into larger, more distinct subphases.

The thermoplastic phase will generally comprise from about 10% to about 95% by volume of the thermoplastic starch composition, preferably from about 10% to about 90% by volume, more preferably from about 20% to about 80% by volume, and most preferably form about 30% to about 70% by volume. The relative concentrations of the thermoplastic starch and other polymeric subphases will be discussed hereinafter.

1. Starch

The starch component of the thermoplastic phase may comprise any known starch material, including one or more unmodified starches, modified starches, and starch derivatives. Nevertheless, preferred starches, both from the standpoint of cost and of processability, will include most any unmodified starch that is initially in a native state as a granular solid and which will form a thermoplastic melt by mixing and heating in the presence of an appropriate plasticizer. Starch is a natural carbohydrate chain comprising polymerized glucose molecules in an $\alpha$-(1,4) linkage and is found in nature in the form of granules. Such granules are easily liberated from the plant materials by known processes. Starch granules include two different types of polymerized glucose chains: unbranched, single-chained amylose and branched multi-chained amylopectin.

In general, starch granules have a coating or outer membrane that encapsulates the more water soluble amylose and amylopectin chains within the interior of the granule. This outer shell makes unmodified native starch granules generally insoluble in water at room temperature. However, when heated in the presence of water or other polar solvent such as glycerin, the solvent is able to soften and penetrate the outer membrane and cause the inner starch chains to absorb water and swell. This swelling will, at some point, cause the outer shell to rupture and allow the irreversible gelatinization or destructurization of the starch granule. This process is irreversible because, once gelatinized or destructurized, starch can never revert to its native, cold water-resistant, granular state. The exact temperature at which starch will gelatinize in a given plasticizing solvent depends on the type of starch. In general, the higher the amylose content, the higher the gelatinization temperature in water due to the greater insolubility of amylose compared to amylopectin. In the presence of mixing, such as high shear mixing, the rate of melting or destructurization is greatly increased.

Once gelatinized or destructurized, the various starch polymer chains comprising amylose and amylopectin polymers, which are initially compressed within the granules, will stretch out and form a generally disordered intermingling of polymer chains, particular while in a molten or gelatinized state. Upon resolidification, however, the chains can reorient themselves in a number of different ways in order to form crystalline or amorphous solids having varying strengths depending on the orientation of the starch polymer chains. Orienting, cross-linking, and reacting the polymer chains with other components can greatly affect the resulting physical and mechanical properties of the resolidified starch melt.

Although starch is produced in many plants, an important source are seeds of cereal grains, such as corn, waxy corn, wheat, sorghum, rice, and waxy rice. Another important source includes tubers, such as potatoes, roots such as tapioca (i.e., cassava and manioc), sweet potato, and arrowroot, and the pith of the sago palm. In general, potato and waxy corn starches are generally higher in amylopectin, while corn and rice starches are generally higher in amylose. Depending on the desired properties of the final thermoplastic starch composition, one may select the type of starch that will give the most desired benefits, both in terms of cost and final physical, mechanical and strength properties.

The concentration of starch within the thermoplastic phase can vary greatly depending on whether or not other constituents are added the thermoplastic phase. Because starch is not by itself a thermoplastic material but must be admixed with one or more plasticizers, the concentration of thermoplastic starch within the thermoplastic phase will be understood to include a mixture of starch and plasticizer. Thus, if the thermoplastic phase were to contain 100% of a starch melt, the actual concentration of molecular starch would be less than 100%, with the balance comprising the plasticizer, as well as optional components, such as cross-linking agents, blocking groups, substitution groups, and the like. Because of the difficulty in sorting out the exact identities and concentrations of these other nonstarch constituents, particularly after they have interacted with the starch molecules, the starch, plasticizers, and other constituents added to react with the starch will be referred to in the aggregate as comprising the "starch melt" fraction or component.

In some cases, as will be discussed more fully in the section relating to preferred methods of forming starch melts, it may be particularly advantageous to use starch that has been predried to remove some or substantially all of the water that is naturally associated with native starches. In general, native unmodified starch granules will include from about 10–20% water by weight. Because this water can have a variety of possibly negative effects during the formation of starch melts, for example when it is desired to react the starch with another constituent by means of a condensation reaction, it may be advantageous to remove this water before mixing and heating the starch with the plasticizer to form a melt, or at least before reacting the starch melt with the other constituent. In those cases where it may be desirable to pre-dry the starch while in a native granular state, it will be preferable to reduce the water content to below about 10% by weight of the starch granules, more preferably to below about 5% by weight, and most preferably to below about 3% by weight.

In other cases, it may be adequate to simply remove a substantial portion of the water from the starch melt by evaporation by means of a venting or degassing during processing, preferably to concentration of less than about 5% by weight of the starch, more preferably to below about 3% by weight, and most preferably to below about 1% by weight before cooling and resolidification. Venting or degassing can also be employed to remove reaction water that may be produced within the thermoplastic phase by, e.g., condensation reactions between starch and one or more synthetic polymers, acids, acid halides or anhydrides, or other admixtures. Where an extremely low amount of water will remain within the thermoplastic starch melt after venting, it will generally be necessary to include one or more low volatile plasticizers so as to maintain the starch as a melt as the water is released. As such, the low volatile plasticizers will "replace" the water normally associated with starch.

In some cases, it may be preferable for the thermoplastic phase to include 100% of the "starch melt", as that term has been defined above. In those instances where an additional thermoplastic polymer is included, the starch melt will preferably have a concentration in a range from about 10% to about 90% by weight of the thermoplastic phase, more preferably in a range from about 20% to about 80% by weight, and most preferably in a range from about 30% to about 70% by weight.

2. Plasticizers

In manufacturing thermoplastically processible starch melts, there have been essentially two alternative approaches that utilize what may be considered to be two different plasticizing or melt initiating systems. For simplicity, these two alternative approaches may be referred to as "destructurized starch" and "thermoplastic starch", although other terms have been used in the art. The term "destructurized starch" has typically been used when referring to processes for forming a starch melt in which the starch granules are made thermoplastic by heating and mixing the starch in the presence of water under carefully controlled conditions of temperature, pressure and concentration. Because water is generally volatile at the temperatures necessary to form a starch melt, the destructurization process must generally take place within a closed vessel capable of preventing the escape of water by evaporation so as to maintain the desired concentration of water throughout the manufacturing process. By maintaining a constant water concentration within the closed vessel, it is possible to form starch melts in which the water acts as the primary or sole, plasticizing solvent. Upon cooling to below the melting or softening point or range, the destructurized starch melt resolidifies as a thermoplastic material.

Gelatinizing or destructurizing starch in any quantity of water will not always yield a starch material that will act as a thermoplastic material, but only where sufficiently low water is used so that the resulting melting point or softening range is sufficiently higher than room temperature so as to reliably form a solidified product upon cooling. If too much water is used, the gelatinized starch can only be solidified by evaporating away a substantial portion of the water in order to either raise the melting point or softening range sufficiently or in order to dry it to the point of recrystalization so that it solidifies while being heated rather than after being cooled.

In order for "destructurized starch" to behave as a thermoplastic material that will solidify as a result of cooling sufficiently below its melting or softening point, it will generally be necessary for the water to be included in a range from about 5% to about 4% by weight of the starch (including the water naturally found in native starch). If more than about 40% is included, the melting point or range will usually be too low for the starch/water mixture to reliably solidify within a reasonable period of time when cooled. If the water is not maintained above about 5% throughout processing, and absent the inclusion of another plasticizer such as glycerin, the starch will usually not form or be maintained as a melt at a temperature sufficiently lower than the decomposition temperature of starch, which is about 230–250° C.

One problem with using water as a melt initiation agent is that it may, in some cases, inhibit desired chemical reactions between the starch melt and other additives, unless removed by evaporation prior to the occurrence of such reactions. The reactive additive may be a nonpolymeric reagent, or it may comprise one or more thermoplastic polymers that have reactive groups that can react with, e.g., the hydroxyl groups of the starch polymer. For example, it may be desirable to reduce the hydrophobicity of the starch polymer by reacting or otherwise blocking the hydroxyl groups such as by esterification, etherification, or other condensation reaction, or by substitution, elimination, or formation of acetal or ketal groups. Because water is a byproduct of condensation reactions, its presence within the starch melt may inhibit or even prevent such reactions. Water may also compete as a reactant with the starch in some cases.

Certain polymers may also experience degradation or partial cleavage of the polymer chain when heated in the presence of water. For example, it is known that many polyesters can experience chain degradation and reduction of molecular weight through hydrolysis reactions with water at elevated temperatures. Reducing the molecular weight of polymers tends to weaken films and other articles made therefrom. Although not known for sure, it may be possible for water to degrade or hydrolyze a significant proportion of the acetal linkages within starch molecules at elevated temperature, particularly under high shear conditions, which may reduce the molecular weight of the starch molecules to some extent. Thus, in order to prevent hydrolysis of polymer linkages within one or polymers within a thermoplastic starch melt, it may be preferable to limit the length of time that certain polymers are exposed to substantial moisture at elevated temperatures.

Destructurized starch may also tend to form retrograde starch over time as a result of moisture loss. Retrograde starch is much more brittle and less flexible compared to thermoplastic starch compositions having lower crystallinity. When destructurized starch melts are initially formed, the water is able to interact with the hydroxyl groups of the starch molecules in order to interrupt the starch molecules and keep them from associating themselves into a more crystalline geometry. However, in normal ambient conditions the water within destructuized starch is free to migrate into and out of the destructurized starch over time, thus compromising the ability of the water to prevent crystallization and retrogradation of the destructurized starch.

In view of the volatile nature of water and also the tendency of water to inhibit certain desired chemical reactions or hydrolyze certain polymers, another approach to making a starch melt is to substitute some or all of the water with less volatile plasticizers (e.g., glycerin) or even higher molecular weight plasticizers that are essentially nonvolatile. For simplicity, less volatile and nonvolatile plasticizers or solvents that have a vapor pressure of less than 1 bar at the melting temperature of the starch melt shall be collectively referred to as "low volatile" plasticizers for purposes of this disclosure. Conversely, melt initiators comprising volatile solvents (e.g., water, alcohols, amines, aldehydes, ketones, organic acids, esters, amides, imides, and the like) that have a vapor pressure of 1 bar or greater at the melting temperature of the starch melt will be considered to "volatile" melt initiators or solvents. In the past, some have referred to starch melts that use low volatile plasticizers instead of water as "thermoplastic starch". On the other hand, starch that has been melted in the presence of water has been referred to as "destructurized starch". Nevertheless, for purposes of the present invention, the terms "thermoplastic starch", "thermoplastic starch composition" and "thermoplastically processible starch" shall be understood to include compositions that include both low volatile and volatile plasticizers to form the starch melt.

Although not an exhaustive list, examples of preferred low volatile plasticizers that can be used alone or together in various mixtures to make the thermoplastic starch compositions within the scope of the present invention include ethylene glycol, propylene glycol, glycerin, 1,3-propanediol, 1,2-butandiol, 1,3-butandiol, 1,4-butanediol, 1,5-pentandiol, 1,5-hexandiol, 1,6-hexandiol, 1,2,6-hexantriol, 1,3,5-hexantriol, neopentylglycol, sorbitol acetate, sorbitol diacetate, sorbitol monoethoxylate, sorbitol diethoxylate, sorbitol hexaethoxylate, sorbitol dipropoxylate, aminosorbitol, trihydroxymethylaminomethane, glucose/PEG, the reaction product of ethylene oxide with glucose, trimethylolpropane monoethoxylate, mannitol monoacetate, mannitol monoethoxylate, butyl glucoside, glucose monoethoxylate, α-methyl glucoside, the sodium salt of carboxymethylsorbitol, polyglycerol monoethoxylate, erythritol, pentaerythritol, arabitol, adonitol, xylitol, mannitol, iditol, galactitol, allitol, sorbitol, polyhydric alcohols generally, esters of glycerin, formamide, N-methylformamide, DMSO, mono- and diglycerides, alkylamides, polyols, trimethylolpropane, polyvinylalcohol with from 3 to 20 repeating units, polyglycerols with from 2 to 10 repeating units, and derivatives of the foregoing.

Examples of derivatives include ethers, thiethers, inorganic and organic esters, acetals, oxidation products, amides. and amines.

In general, more preferred plasticizers will have a solubility parameter of at least about 15 $kg^{1/2}cm^{-3/2}$ within a temperature range of about 150–300° C., and most preferably in a range from about 15 $kg^{1/2}cm^{-3/2}$ to about 25 $kg^{1/2}cm^{-3/2}$. Such plasticizers can be blended with a wide variety of other co-solvents or plasticizers both within and without the preferred solubility parameter ranges.

The concentration of low volatile plasticizer that is used may vary greatly depending on the type of starch and plasticizer being used, as well as on the identity and concentration of other possible components within the thermoplastic phase. In some cases it may be desirable to use a mixture of different plasticizers in order to impart specifically engineered properties into both the starch melt and final thermoplastic starch composition. In general, the low volatile plasticizer will have a concentration in range from about 1% to about 70% by weight of tee starch, more preferably in a range from about 5% to about 50% by weight, and most preferably in range from about 10% to about 30% by weight.

Low volatile plasticizers yield thermoplastic starch compositions that tend to remain more stable, more flexible, less crystalline, and less brittle over time compared to destructurized starch. They do this by keeping the starch more amorphous over time. Unlike water, which can readily migrate into and out of destructurized starch by evaporation under ambient conditions to form crystalline starch, low volatile plasticizers tend to remain more closely associated with the hydroxyl groups of the starch molecules over time. Thus, by remaining interposed between the various starch polymer chains within the composition, the plasticizer can better inhibit recrystalization and retrogradation of the starch chains compared to water or other more volatile plasticizers.

Nevertheless, some "low volatile" plasticizers have a vapor pressure that allows for significant, albeit more slow, evaporation from solidified starch melts. Such evaporation may be more pronounced when an article made from a thermoplastic starch composition is exposed to heat. An example of a low volatile plasticizer that nevertheless has a significant vapor pressure is glycerin. In the case where a low volatile plasticizer may tend to evaporate or otherwise migrate out of the thermoplastic starch composition over time, it may be preferable in some cases to also include a higher molecular weight plasticizer that has a much lower vapor pressure in order to inhibit migration and loss of the higher vapor pressure, low volatile plasticizer from the solidified thermoplastic starch composition. Moreover, because some higher molecular weight plasticizers are in a solid state at room temperature, they may remain more firmly embedded within thermoplastic starch compositions at room temperature compared to plasticizers that are liquid at room temperature. An example of a higher molecular weight plasticizer that has a much lower vapor pressure than glycerin and which is a solid at room temperature is sorbitol.

Moreover, in those cases where the thermoplastic starch melt is exposed to a venting process in order to remove unwanted water vapor prior to shaping, it may be necessary to account for the possibility that a portion of a low volatile plasticizer having a significant vapor pressure at the melt temperature may also be removed by evaporation as a result of the venting process. The formation of azeotropes with water and/or steam distillation of low volatile or even nonvolatile plasticizers by water can further increase the rate of loss of low volatile plasticizers during venting. Of course, maintaining lower water, or even eliminating water altogether, can reduce or prevent loss of the low volatile plasticizer.

3. Additional Polymers

In many cases it may be desirable to include one or more additional polymers within the thermoplastic phase in order to improve the properties of the resulting thermoplastic starch composition. Both synthetic and natural polymers may be included within the thermoplastic phase. Such polymers may improve the processability of the starch melts, although their major contribution will typically be to improve the mechanical and/or chemical properties of the final hardened thermoplastic starch composition. For example, more hydrophobic polymers may be used to decrease the sensitivity of the final thermoplastic starch composition to changes in ambient moisture and/or to make the material more water insoluble or impermeable.

Depending on its chemical nature and, to some extent, the process and type of plasticizer being used, the additional thermoplastic polymer may or may not actually chemically interact with the thermoplastic starch subphase. Although virtually any thermoplastic polymer can be mixed with the thermoplastic starch subphase to some extent to form a blend intermixed thermoplastic subphases, the thermoplastic phase will exhibit more uniform mechanical properties where the starch and other thermoplastic polymer are more homogeneously intermixed. It has been found that the most homogeneous blending of starch and other polymer occurs where at least a portion of the starch and other polymer are chemically linked together, such as by a condensation reaction or some other chemical linking reaction. It would be ideal if substantially all of the starch were to become chemically linked with the other polymer(s). In many cases, however, only a portion of the starch will be able to react with the other polymer(s). In such a case, it has been found that the portion of the starch that reacts with the other polymer(s) will advantageously form a hybrid polymer that acts as a compatibilization subphase or phase mediator that yields a more homogeneously blended mixture of the unreacted phases of starch and other polymer(s). It should be understood, however, that the present invention is not limited by the extent to which the starch and other polymer may or may not chemically interact. A wide variety of polymers that do not react with starch may be used within the scope of the invention.

Examples of preferred biodegradable synthetic thermoplastic polymers that may be blended with the thermoplastic starch phase include, but are not limited to:

(a) homopolymers of aliphatic and aromatic hydroxyacid monomers and their corresponding lactones or lactides;

(b) copolymers of a first monomer of group (a) and second monomer selected from the group consisting of (1) a monomer of group (a) different from the first monomer and (2) aliphatic or aromatic isocyanates;

(c) block or graft copolymers between the homopolymers and copolymers of groups (a) or (b) and one or more of the following components:

(i) cellulose or cellulose derivatives such as cellulose acetate, cellulosic ethers, and carboxymethylcellulose;

(ii) amylose, amylopectin, natural starch, or modified starches;

(iii) polymers derived from reaction of diols (such as ethylene glycol, propylene glycol, butylene glycol, polyoxyethylene glycol, polyoxypropylene glycol, neopentyl glycol, 1,4-butandiol, cyclohexandiol, or dianhydrous sorbitol), polyester prepolymers, or polymers having diol terminal groups with:

aromatic or aliphatic bifunctional isocyanates or epoxides,
aliphatic bicarboxylic acids (such as malonic, succinic, maleic, fumaric, itaconic, glutaric, adipic, pimelic, suberic, azelaic, or sebacic acids), bicarboxylic cycloaliphatic acids (such as cyclohexane bicarboxylic acids or 2,2,2-bicyclooctane bicarboxylic acid), or aromatic acids or anhydrides (such as phthalic acid);
(iv) polyurethanes, polyamide-urethanes from diisocyanates and aminoalcohols, polyamides, polyesteramides from bicarboxylic acids and aminoalcohols, polyester-urea from aminoacids and diesters of glycols,
(v) polyhydroxylated polymers (such as polyvinylalcohol), ethylene-vinylalcohol copolymers, totally or partially hydrolyzed, and polysaccharides;
(vi) polyvinylpyrrolidone, polyvinylpyrrolidonevinylacetate copolymers, polymethacrylates;
(d) polyesters obtained from monomers or comonomers such as defined above in (a) and (b) upgraded with chain extenders, such as isocyanates, epoxides, phenylesters and aliphatic carbonates; and
(e) polyesters obtained from monomers and comonomers defined above in (a) and (b) partially cross-linked by means of polyfunctional acids such as trimellitic acid, pyromellitic acid, polyisocyanates and polyepoxides.

As monomers of aliphatic hydroxyacids having from 2 to 24 carbon atoms, the following acids and corresponding lactides or lactones may be used:

α-hydroxyacids such as lactic acids and the corresponding lactide, glycolic acid and the corresponding glycolide;

β-hydroxyacids such as hydroxypropionic acid, hydroxypivalic and hydroxypelargonic acid and the corresponding lactone;

γ-hydroxyacids such as hydroxybutyric and the corresponding lactone;

δ-hydroxyacids such as hydroxyvaleric acid and the corresponding lactone;

ε-hydroxyacids;

hydroxyacids having the hydroxy group placed beyond the 6-position such as 10-hydroxydecanoic acid; products of natural origin such as sabinic acid (12-hydroxydodecanoic) and juniperic acid (16-hydroxyhexadecanoic); unsaturated hydroxyacids such as ricinoleic acid; acids deriving from alphahydroxylation of fatty acids such as myristic, palmitic and stearic acids; acids deriving from hydroxylation of unsaturated fatty acids such as oleic, ricinoleic, linolenic and erucic acids;

cycloaliphatic hydroxyacids such as the hydroxyacids of cyclohexane and of 2,2,2-bicyclooctane.

Homopolymers and copolymers of ε-hydroxyacids are preferred, particularly of 6-hydroxycaproic acid, 6-hydroxyoctanoic, 3,7-dimethyl-6-hydroxyoctanoic acid and corresponding lactones, such as poly-ε-caprolactone.

As copolymers of aliphatic hydroxyacids with isocyanates, copolymers of epsilon-caprolactone with 4,4'-diphenylmethane-diisocyanate (MDI), tolylenediisocyanate (TDI), isophoron diisocyanate or hexanmethylene diisocyanate are preferred.

As the copolymers of aliphatic hydroxyacids and the corresponding lactones with aromatic hydroxyacids/ copolymers of ε-caprolactone with β-phenyl lactic acid or mandelic acid are preferred.

Another class of useful polyesters are the so-called "aliphatic-aromatic copolyesters" which have superior mechanical and physical properties by virtue of the aromatic portion, as well as good biodegradability as a result of the aliphatic portion. Examples of useful aliphatic-aromatic copolyesters that may be blended within the thermoplastic starch compositions of the present invention include, but are not limited to, polyesters described in U.S. Pat. No. 5,292,783 to Buchanan et al., U.S. Pat. No. 5,446,079 to Buchanan et al., U.S. Pat. No. 5,559,171 to Buchanan et al., U.S. Pat. No. 5,580,911 to Buchanan et al., U.S. Pat. No. 5,599,858 to Buchanan et al., U.S. Pat. No. 5,900,322 to Buchanan et al., and U.S. Pat. No. 5,817,721 to Warzelhan et al. For purposes of disclosing exemplary aliphatic-aromatic copolyesters that may be used to form the inventive starch based compositions of the present invention, the foregoing patents are incorporated herein by specific reference. A presently useful aliphatic-aromatic copolyester is 1,4-butandioladipinic acid and teraphthalic acid with a chain extender comprising isocyanate.

The foregoing polymers are preferred because they have been found to form good thermoplastic blends of starch having good biodegradability and good mechanical and chemical properties. In addition, the foregoing polymers comprise polyesters that are capable of cross esterifying with starch, especially where little or no water is used. Besides the foregoing, virtually any synthetic or natural polymer that can form a cross esterification or other condensation reaction with the hydroxyl groups on the starch polymers are within the scope of the present invention. In fact, any polymer that can react with the starch will be preferred since the resulting starch/polymer blends will be chemically interlinked together and thus more homogeneous.

Nevertheless, there is a huge variety of other polymers that may or may not react with the starch but that nevertheless may be utilized within the scope of the present invention. These include polyolefines, alkylsiloxanes, polyesteramides, polyethers, polyethylene adipate (PEA), polytetramethylene adipate and the like aliphatic polyesters and their derivatives, cycloaliphatic polyesters and their derivatives, copolymers derived from a thermoplastic synthetic resin and a biodecomposable aliphatic polyester, polyethylene, polypropylene, ethylene-vinylacetate copolymer and its saponified products, polyester resins such as polyethylene terephthalate (PET), polybutylene terephthalate, vinyl resins such as polyvinyl chloride, polyvinylidene acetate, polystyrene and styrene copolymers, polyamide resins, polycarbonate resins, cellulosic esters (e.g., cellulose formate, cellulose acetate, cellulose diacetate, cellulose propionate, cellulose butyrate, cellulose valerate, and mixtures of the foregoing), ethylene acrylate maleic acid and hydride terpolymer, polyacrylic acids, polycaprolactone/polyvinyl alcohol block copolymer, polysaccharides that have been chemically modified to contain added hydroxyalkyl groups, copolymers of vinyl pyrrolidone, polyalkyleneimine polymers and copolymers, styrene-sulfonic acid polymers, copolymers and salts thereof, and virtually any polymer that can be thermoplastically processed at a temperature that would allow it to be blended with the thermoplastic starch subphase.

Examples of preferred natural polymers or polymers derived from natural materials that can be blended into thermoplastic starch melts include a wide variety of cellulosic materials, proteins, and polysaccharide materials such as gums. Because cellulose is chemically similar to starch, cellulose based materials will have a greater affinity for starch compared to most other materials. One class of cellulose derived materials includes the cellulosic ethers, examples of which include methylhydroxyethylcellulose, hydroxymethylethylcellulose, carboxymethylcellulose, methylcellulose, ethylcellulose, hydroxyethylcellulose, hydroxyethylpropylcellulose, and the like, as well as mixtures or derivatives thereof. Another class of cellulose derivatives are esters of cellulose, such as cellulose acetate, cellulose diacetate, cellulose formate, cellulose propionate, cellulose butyrate, mixed esters, and the like.

Other polysaccharide-based polymers that can be incorporated into starch melts include alginic acid, alginates, phycocolloids, agar, gum arabic, guar gum, acacia gum, carrageenan gum, furcellaran gum, ghatti gum, psyllium gum, quince gum, tamarind gum, locust bean gum, gum karaya, xanthan gum, and gum tragacanth, and mixtures or derivatives thereof.

Suitable protein-based polymers include, for example, Zein® (a prolamine derived from corn), collagen (extracted from animal connective tissue and bones) and derivatives thereof such as gelatin and glue, casein (the principle protein in cow milk), sunflower protein, egg protein, soybean protein, vegetable gelatins, gluten and mixtures or derivatives thereof.

Although it will be preferable in many cases to reduce the water content of the thermoplastic phase, it is nevertheless within the scope of the invention to use water as a significant portion of the plasticizer. In the case where it is not critical to reduce or eliminate water altogether, it may be advantageous to include one or more water-dispersible polymers. Examples of water-dispersible polymers that may be used in both the presence or absence of water include polyvinyl pyrrolidone, polyethylene glycol, polyvinyl alcohol, polyvinylmethyl ether, polyacrylic acids, polyacrylic acid salts, polyvinyl acrylic acids, polyvinyl acrylic acid salts, polyacrylimides, ethylene oxide polymers, polylactic acid, latex (which is a broad category that includes a variety of polymerizable substances formed in a water emulsion, an example of which is styrene-butadiene copolymer), and mixtures or derivatives thereof.

As mentioned above, some polymers such as polyesters or other polycondensates may degrade or undergo chain shortening by hydrolysis if exposed to water at elevated temperature. Although replacing some or all of the water with a different plasticizer may reduce or prevent hydrolysis, some polymers such as polyesters can absorb significant amounts of moisture from the air. In such cases, it may be necessary to subject such polymers to a predrying step in order to prevent subsequent breakdown during thermal processing. Nevertheless, some degree of chain shortening may be desirable since it will increase the number of hydroxyl sites available for subsequent condensation with hydroxyl groups of the thermoplastic starch subphase.

In those instances where one or more additional thermoplastic polymers are included within the thermoplastic phase, the one or more polymers will, in the aggregate, preferably have a concentration in a range from about 10% to about 90% by weight of the thermoplastic phase, more preferably in a range from about 20% to about 80% by weight, and most preferably in a range from about 30% to about 70% by weight.

4. Other Additives

In addition to the basic components of starch, plasticizer and optional natural and synthetic polymers, other liquids, solids, or gases may be considered to be part of the thermoplastic phase.

It may also be possible to add a reactive agent that in addition to, or instead of, the additional thermoplastic polymer can improve the properties of the thermoplastic starch material. Such reactive agents may include, but are not limited to, cross-linking agents, used to cross link the starch molecules with either other starch molecules or the one or more additional thermoplastic polymers, reagents that add additional functional groups to the starch or additional polymer, reagents that may serve to block the hydroxyl functional groups on the starch polymers, and reagents that serve to form a phase mediator. Examples of the foregoing include monovalent, divalent, and polyvalent carboxylic acids, as well as their anhydrides, acid halides, and acid amides, epoxides, formaldehyde and/or urea and their derivatives, divinyl sulfones, isocyanates, oxo compounds such as acetone formaldehyde or polyvalent oxo compounds, cyanamide, dialdehydes, methylureas, and melamineformaldehyde resins.

In the case where it is desired for the starch to form an ester with another thermoplastic polymer, it may be helpful, in addition to eliminating most or all of the water, to employ an esterification catalyst or promoter. For example, the esterification reaction between thermoplastic starch and polyesters, such as polycaprolactone or aliphatic-aromatic copolyesters, can be facilitated by $Ti(OR)_4$, where R is an appropriate alkyl or aryl unit. However, because $Ti(OR)_4$ will hydrolyze in the presence of water, it will be preferable to eliminate most or all of the water in the case where $Ti(OR)_4$ is used.

In addition, nonreactive additives such as humectants (e.g., silica gel and zeolites), dispersants, lubricants (e.g., lipids or metal stearates), softeners, mold release agents (e.g., metal stearates), flexibilizers, and blending enhancers can be added.

B. Solid Phases

1. Inorganic Particulate Fillers

Besides the thermoplastic phase, the other required phase within the thermoplastic starch compositions of the present invention is the filler phase, which may include an inorganic particulate filler. In general, this phase will comprise a plurality of individual filler particles. In many cases the inorganic fillers within the scope of the present invention will be substantially inert and unreactive and, as such, will constitute a passive filler that does not contribute any additional binding or bonding activity. Filler particles that are capable of chemically bonding, interacting or otherwise associating with the starch and other components in the thermoplastic phase are certainly within the scope of the present invention, however. The term "particle" should be interpreted broadly to include filler particles having any of a variety of different shapes and aspect ratios. Both spheroids and flakes are examples of "particles" as that term is defined. In general, however, particles having an aspect ratio (i.e., the ratio of length to thickness) greater than about 10:1 may be better understood as constituting a "fiber" as that term will be defined and discussed hereinbelow.

Virtually any known filler, whether inert or reactive, can be incorporated into the thermoplastic starch compositions of the invention. In general, adding an inorganic filler will tend to greatly reduce the cost of the resulting thermoplastic starch composition. If a relatively small amount of inorganic filler is used, the effects on the strength of the final composition are minimized, while adding a relatively large amount of inorganic filler will tend to maximize those effects. In those cases where adding the inorganic filler will tend to detract from a critical physical parameter, such as tensile strength or flexibility, only so much of the filler should be added in order to reduce the cost of the resulting composition while retaining adequate mechanical properties required by the intended use. However, in those cases where adding the inorganic filler will improve one or more desired physical properties of a given application, such as stiffness and compressive strength, it may be desirable to maximize the quantity of added filler in order to provide this desired property while also proving greatly decreased cost.

Because different types of inorganic fillers may impart different properties to the final thermoplastic starch composition, two or more fillers may be included that can impart these varying and desired properties. It can be readily appreciated that one of ordinary skill in the art, using a microstructural engineering approach, can select the types and amount of the various inorganic fillers that may be included within the thermoplastic starch composition in order to engineer a final material having the desired strength properties while taking advantage of the cost-reducing properties of adding the inorganic filler. Of course, even if cost is not a factor, or if the addition of an inorganic filler does not appreciably decrease the cost, adding a significant quantity of an inorganic filler as taught herein for any reason is certainly within the scope of the invention.

In general, in order to maximize the quantity of inorganic filler while mining the deleterious mechanical effects of adding the filler as much as possible, it will generally be preferable to select filler particles in a manner that decreases the specific surface area of the particles. The specific surface area is defined as the ratio of the total particle surface area versus the total particle volume. One way to decrease the specific surface area is to select particles that have a more uniform surface geometry. The more jagged and irregular the particle surface geometry, the greater will be the ratio of surface area to volume of that particle. Another way to decrease the specific surface area is to increase the particle size.

Particles that have decreased surface area generally require less of the thermoplastic phase for lubrication in order to provide a desired rheology during mixing and molding. Particles having decreased specific surface also require less thermoplastic material for subsequent binding. Conversely, particles having increased surface area per unit volume of particles will generally require more of the thermoplastic phase for lubrication during shaping and subsequent binding. Hence, all things being equal, decreasing the specific surface area of the filler particles allows more of the filler to be used while maintaining desired mixture rheology while in a thermoplastic melt state. Similar, decreasing the specific surface area of the filler particles allow more of the filler to be used while maintaining desired final strength properties.

In view of the advantages of decreasing the specific surface area of the inorganic filler, it will be preferable to include inorganic filler particles having a specific surface area in a range from about 0.1 $m^2/g$ to about 400 $m^2/g$, more preferably in range from about 0.15 $m^2/g$ to about 50 $m^2/g$, and most preferably in a range from about 0.2 $m^2/g$ to about 2 $m^2/g$.

Related to decreased specific surface area in improving the rheology and final strength properties of the thermoplastic starch compositions of the present invention is the concept of particle packing. Particle packing relates to the use of differently sized and graded filler particles that are selected in order for the particles to more completely fill the interstitial spaces between the particles. In general, the spaces between the particles will be occupied by a corresponding quantity of the thermoplastic phase. To be sure, a certain minimum amount of thermoplastic phase material will always be required to adequately lubricate the particles during the shaping process and in order to subsequently bind the particles together. Nevertheless, poorly packed filler particles having excess interstitial space therebetween will require more of the thermoplastic phase to occupy the interstitial space while not providing any additional lubricating and binding activity.

Since both the actions of lubrication and the binding of particles are generally limited to regions immediately surrounding the particles, there is, for any given system of inorganic filler particles and thermoplastic phase a "lubrication zone" and "binding zone". Within the "lubrication zone", the thermoplastic polymer melt is able to impart most if not all of its inherent lubrication activity. Thus, any thermoplastic polymer melt located outside this lubrication zone will constitute excess thermoplastic polymer so far as the operation of lubrication is concerned. Likewise, resolidified thermoplastic polymer located within the "binding zone" will impart most of its inherent binding activity, while polymer located outside the binding zone will constitute excess thermoplastic polymer so far as the binding function is concerned. Thus, it can be readily seen that thermoplastic polymer that is located outside of both the lubrication and binding zones may be considered to be excessive and wasteful in those cases where it is desired to maximize the inorganic filler content and thereby minimize the thermoplastic polymer content.

In order to reduce the amount of thermoplastic polymer phase required to impart a given amount of lubrication and subsequent binding, it will be advantageous to select particles that will pack together in a manner that reduces the interstitial space between the particles, particularly the "wasted" space that would otherwise be occupied by the thermoplastic phase. Particle packing techniques allow for a reduction in wasted interstitial space while maintaining adequate particle lubrication and, hence, mixture rheology, while also allowing for more efficient use of the thermoplastic phase as a binder in the final hardened thermoplastic starch compositions of the present invention. Simply stated, particle packing is the process of selecting two or more ranges of particle sizes in order that the spaces between a group of larger particles is substantially occupied by a selected group of smaller particles. In this manner, it is possible to select differently sized particles that maintain sufficient interstitial space to provide the aforementioned lubrication and binding zones, while reducing the volume of "wasted" space between the lubrication and binding zones that must otherwise be occupied by the thermoplastic phase. Eliminating the "wasted" space by filling these spaces with inorganic filler particles allows for the inclusion of more filler while maintaining the desired level of particle lubrication during shaping and particle binding upon solidification the thermoplastic phase.

In order to optimize the packing density of the inorganic filler particles, differently sized particles having sizes ranging from as small as about 0.01 micron to as large as about 2 mm may be used. Of course, the thickness and other physical parameters of the desired article to be manufactured from any given thermoplastic starch composition may often dictate the upper particle size limit. In general, the particle packing will be increased whenever any given set of particles is mixed with another set of particles having a particle size (i.e., width and/or length) that is at least about 2 times bigger or smaller than the first group of particles. The particle packing density for a two-particle system will be maximized whenever the size ratio of a given set of particles is from about 3–10 times the size of another set of particles. Of course, three or more different sets of particles may be used to further increase the particle packing density.

The degree of packing density that will be "optimal" will depend on a number of factors including, but not limited to, the types and concentrations of the various components within both the thermoplastic phase, the inorganic filler phase, and other optional phases, the shaping method that will be employed, and the desired mechanical and other performance properties of the final articles to be manufactured from a given thermoplastic starch composition. One of ordinary skill in the art will know the level of particle packing that will optimize the packing density by practicing the invention described herein.

A more detailed discussion of particle packing techniques can be found in U.S. Pat. No. 5,527,387 to Andersen et al., as well as the following article coauthored by one of the inventors of the present invention: Johansen, V. & Andersen, P. J., "Particle Packing and Concrete Properties," *Materials Science of Concrete II* at 111–147, The American Ceramic Society (1991). Further information relating to particle packing techniques is available in the Doctoral Dissertation of Andersen, P. J., "Control and Monitoring of Concrete Production—A Study of Particle Packing and Rheology," The Danish Academy of Technical Sciences. For purposes of disclosing particle packing techniques useful in practicing the present invention, the foregoing patent, article and doctoral dissertation are incorporated herein by specific reference.

In those cases where it is desired to take advantage of the improved properties of rheology and binding efficiency utilizing particle packing techniques, it will be preferable to include inorganic filler particles having a particle packing density in a range from about 0.5 to about 0.95, more preferably in range from about 0.6 to about 0.9, and most preferably in a range from about 0.7 to about 0.8.

Examples of use full inorganic fillers that may be included within the thermoplastic starch compositions of the present invention include such disparate materials as sand, gravel, crushed rock, bauxite, granite, limestone, sandstone, glass beads, aerogels, xerogels, mica, clay, synthetic clay, alumina, silica, fly ash, fumed silica, fused silica, tabular alumina, kaolin, microspheres, hollow glass spheres, porous ceramic spheres, gypsum dihydrate, insoluble salts, calcium carbonate, magnesium carbonate, calcium hydroxide, calcium aluminate, magnesium carbonate, titanium dioxide, talc, ceramic materials, pozzolanic materials, salts, zirconium compounds, xonotlite (a crystalline calcium silicate gel), lightweight expanded clays, perlite, vermiculite, hydrated or unhydrated hydraulic cement particles, pumice, zeolites, exfoliated rock, ores, minerals, and other geologic materials.

Different inorganic fillers will impart their own unique surface characteristics to the composition and may be chosen accordingly. For example, kaolin gives a smoother, less porous finish, while plate-like materials such as mica and other clays yield a shiny surface. Typically, larger filler particles produce a matte surface, while smaller particles produce a glass-like surface. Substantially transparent fillers such as glass beads or spheres can be used to yield a substantially transparent or translucent thermoplastic starch composition.

Hydraulic cement, gypsum hemihydrate and other hydraulically reactive materials are particularly useful filler materials because of their ready availability, extreme low cost, and because they can be used, if desired, to scavenge excess water that might be present within the thermoplastic starch material, thereby eliminating, or at least reducing, the aforementioned deleterious effects of water.

A wide variety of other inorganic fillers may be added to the thermoplastic starch compositions within the scope of the present invention, including materials such as metals and metal alloys (e.g., stainless steel, iron, and copper), balls or hollow spherical materials (such as glass, polymers, and metals), filings, pellets, flakes and powders (such as microsilica).

Another class of inorganic fillers that may be added to the thermoplastic starch compositions includes inorganic gels and microgels such as silica gel, calcium silicate gel, aluminum silicate gel, and the like. These can be added in solid form or may be precipitated in situ. Since gels and microgels tend to absorb water, they can be added to reduce the negative effects of water within the thermoplastic starch compositions during processing, thereby increasing the ability of starch to react with given reagents and thermoplastic polymers. In addition, the highly hygroscopic nature of silica-based gels and microgels allows them to be used as moisture scavengers within the final hardened thermoplastic starch compositions. By preferentially absorbing moisture from the air, the gels and microgels can reduce moisture sensitivity of the thermoplastic starch compositions, particularly when exposed to high humidity, which can cause solidify starch melts to soften. Controlling the moisture content of the thermoplastic starch compositions allows for more careful control of the elongation, toughness, modulus of elasticity, bendability, foldability, flexibility, and ductility of articles manufactured therefrom. Zeolites can also be added to preferentially absorb moisture in order to reduce the negative effects of moisture in thermoplastic starch compositions.

The particle size or range of particle sizes of the inorganic fillers will depend on the wall thickness of the film, sheet, or other article that is to be manufactured from the thermoplastic starch composition. In general, the larger the wall thickness, the larger will be the acceptable particle size. In most cases, it will be preferable to maximize the particle size within the acceptable range of particle sizes for a given application in order to reduce the cost and specific surface area of the inorganic filler. For films that are intended to have a substantial amount of flexibility, tensile strength and bending endurance (e.g., plastic bags) the particle size of the inorganic filler will preferably be less than about 10% of the wall thickness of the film. For example, for a blown film having a thickness of 40 microns, it will be preferable for the inorganic filler particles to have a particle size of about 4 microns or less.

On the other hand, thicker-walled articles, particularly those that are intended to be more rigid, may include inorganic fillers having a particle size up to about 50% of the wall thickness. Thus, for a rigid box having a wall thickness of 2 mm, the inorganic filler particles may have a particle size of up to about 1 mm. Due to the tremendous variety of articles and applications that are possible using the thermoplastic starch compositions of the invention, the preferred particle size may vary greatly. As the range of acceptable particle size increases, it may become more desirable to use particle packing techniques in order to incorporate more inorganic filler without comprising mechanical and strength performances. Based on the teachings of this disclosure, one of ordinary skill in the art will be able to optimize the particle size (or range of particle sizes) for a given application.

The amount of particulate filler added to the thermoplastic starch compositions of the invention will depend on a variety of factors, including the quantity and identities of the other added components, as well as the specific surface area and/or packing density of the filler particles themselves. Accordingly, the concentration of particulate filler within the thermoplastic starch compositions of the present invention may be included in a broad range from as low as about 5% by volume to as high as about 90% by volume of the thermoplastic starch composition. Because of the variations in density of the various inorganic fillers than can be used, it may be more correct in some instances to express the concentration of the inorganic filler in terms of weight percent rather than volume percent. In view of this, the inorganic filler components can be included within a broad range from as low as 5% by weight to as high as 95% by weight of the thermoplastic starch composition.

In those cases where it is desired for the properties of the thermoplastic phase to predominate due to the required performance criteria of the articles being manufactured, the inorganic filler will preferably be included in an amount in a range from about 5% to about 50% by volume of thermoplastic starch composition. On the other hand, where it is desired to create highly inorganically filled systems, the inorganic filler will preferably be included in an amount in a range from about 50% to about 90% by volume.

In light of these competing objectives, the actual preferred quantity of inorganic filler may vary widely. In general terms, however, in order to appreciably decrease the cost of the resulting thermoplastic starch composition, the inorganic filler component will preferably be included in an amount greater than about 15% by weight of the thermoplastic starch composition, more preferably in an amount greater than about 25% by weight, more especially preferably in an amount greater than about 35% by weight, and most preferably in an amount greater than about 50% by weight of the thermoplastic starch composition.

2. Fibers

A wide range of fibers can optionally be used in order to improve the physical properties of the thermoplastic starch compositions of the present invention. Like the aforementioned fillers, fibers will typically constitute a solid phase that is separate and distinct from the thermoplastic phase. However, because of the shape of fibers, i.e., by having an aspect ratio greater than at least about 10:1, they can be added to improve the strength and toughness of the thermoplastic starch compositions. It should be understood, however, that many applications, such as flexible, thin-walled blown bags, may not include any fibers. On the other hand, injection molded and foamed articles will preferably include fibers.

As used in the specification and the appended claims, the terms "fibers" and "fibrous material" include both inorganic fibers and organic fibers. Fibers may be added to the moldable mixture to increase the flexibility, ductility, bendability, cohesion, elongation ability, deflection ability, toughness, and fracture energy, as well as the flexural and tensile strengths of the resulting sheets and articles. Fibrous materials reduce the likelihood that the sheets, films or articles made from thermoplastic starch compositions will shatter when cross-sectional forces are applied.

Fibers that may be incorporated into the thermoplastic starch compositions include naturally occurring organic fibers, such as cellulosic fibers extracted from wood, plant leaves, and plant stems. Virtually any abundant fiber that can be harvested from natural sources will work, although fibers that can be derived from plants that can be harvested in an agribusiness setting can also be utilized in the invention. The use of the second category of fibers would have the additional beneficial effect of preserving our dwindling forests. In addition, inorganic fibers made from glass, graphite, silica, ceramic, rock wool, or metal materials may also be used.

Preferred fibers include cotton, wood fibers (both hardwood or softwood fibers, examples of which include southern hardwood and southern pine), flax, abaca, sisal, ramie, hemp, and bagasse because they readily decompose under normal conditions. However, other fibers such as glass fibers may be preferred depending on the intended use and performance criteria of the sheet or article. Even recycled paper fibers can be used in many cases and are extremely inexpensive and plentiful.

The fibers used in making the sheets and other articles of the present invention preferably have a high length to width ratio (or "aspect ratio") because longer, narrower fibers can impart more strength to the starch-bound matrix without significantly adding bulk and mass to the matrix. The fibers will have an aspect ratio of at least about 10:1, preferably greater than about 25:1, more preferably greater than about 100:1, and most preferably greater than about 250:1.

The fibers may include one or more filaments, fabrics, mesh or mats, and which may be co-extruded, or otherwise blended with or impregnated into, the thermoplastic starch compositions of the present invention.

The amount of fibers added to the thermoplastic starch compositions will vary depending upon the desired properties of the final molded article, with tensile strength, toughness, flexibility, and cost being the principle criteria for determining the amount of fiber to be added in any mix design. Accordingly, the concentration of fibers within the thermoplastic starch compositions of the present invention can be included in a broad range from 0% to about 90% by weight of the thermoplastic starch composition. Preferably, fibers will be included in an amount in a range from about 3% to about 80% by weight of the thermoplastic starch composition, more preferably in a range from about 5% to about 60% by weight, and most preferably in a range from about 10% to about 30% by weight of the thermoplastic starch composition.

It will be appreciated that the strength and other mechanical properties of the fiber will be a very important feature in determining the optimal amount of the fiber to be used. The greater the tensile strength of the fiber, the less fiber that will generally be required to impart a given tensile strength in the resulting product. While some fibers have a high tensile, tear, and burst strength, other types of fibers with a lower tensile strength may be more elastic and flexible. Including higher concentrations of fibers will be particularly useful in these cases where relatively large quantities of inorganic filler have been added such that certain mechanical properties have been compromised. Including a substantial quantity of fibers, which are generally far less expensive than starch/polymer melts, can restore many of the properties that may be diminished as a result of including the inorganic filler component.

In many cases it may be advantageous to include different types of fibers that impart differing properties to the thermoplastic starch compositions. In this way the fibers can even impart synergistic properties to the thermoplastic starch composition. For example, some fibers, such as southern pine and abaca, have high tear and burst strengths, while others, such as cotton, have lower strength but greater flexibility. In the case where both strength and flexibility are desired, a combination of fibers having varying strength and other mechanical properties can be added to the mixture.

Many fibers such as cellulosic fibers have an affinity for water. As such, they can act as a moisture reservoir to help regulate the moisture content of the thermoplastic starch compositions by absorbing or releasing moisture in response to fluctuations in the moisture content of the thermoplastic starch composition. Nevertheless, if it is desirable to reduce the water affinity of the fibers, better water resistance can be obtained by treating the fibers with rosin and alum ($Al_2(SO_4)_3$) or $NaAl(SO_4)_2$), which precipitates out the rosin onto the fiber surface, making the surface highly hydrophobic. The aluminum floc that is formed by the alum can create an anionic adsorption site on the fiber surface for a positively charged organic binder such as a cationic starch. Fibers may even be treated with lipids, fatty acids, and salts of fatty acids in order to make them less hydrophilic.

3. Organic Fillers

The thermoplastic starch compositions of the present invention may also include a wide range of organic fillers. Depending on the melting point of the organic filler being added, the filler may remain as a discrete particle and constitute a solid phase separate from the thermoplastic phase, or it may partially or wholly melt and become partially or wholly associated with the thermoplastic phase. One of ordinary skill in the art will be able to determine before hand, or through routine testing, whether a particular organic filler will remain as a discrete particulate filler or become at least partially associated with the thermoplastic phase. Whether it is desired for the organic filler to be a filler or thermoplastic material will depend on the particular application or use of the resulting thermoplastic starch composition.

Organic fillers may comprise a wide variety of natural occurring organic fillers such as, for example, seagel, cork, seeds, gelatins, wood flour, saw dust, milled polymeric materials, agar-based materials, and the like. Organic fillers may also include one or more synthetic polymers of which there is virtually endless variety. Because of the diverse nature of organic fillers, there will not generally be a preferred concentration range for the optional organic filler component.

C. Void Phase

In addition to the foregoing thermoplastic and solid phases, it is within the scope of the invention to incorporate a void phase, generally consisting of a gaseous substance, in order to reduce the mass per unit volume (i.e. density) of the resulting thermoplastic starch composition. Like the inorganic and organic fillers, voids occupy volume that would otherwise be occupied by the thermoplastic phase and tend to therefore reduce the materials costs of the final thermoplastic starch composition. Voids can also increase the insulating ability of articles manufactured from thermoplastic starch compositions. Like other fillers, the inclusion of void spaces can, in some cases, significantly decrease the strength of articles manufactured from the thermoplastic starch compositions. Thus, the amount of voids in relation to the other components should be controlled in order to yield materials having the requisite density and/or insulation properties while maintaining adequate strength for the intended use or application of the thermoplastic starch composition.

There are a variety of ways to introduce voids within the thermoplastic starch compositions of the present invention, including mechanical and chemical means. For example, voids can be introduced into the thermoplastic starch compositions while in a molten state by means of high shear mixing. High shear auger extruders are one example of a high shear mixing apparatus that may be used to incorporate voids within the thermoplastic starch compositions. Because the thermoplastic starch compositions are generally processed at elevated pressures, the void volume will tend to increase as the materials are exposed to atmospheric pressures but will tend to decrease as the materials are cooled. The relationship between expansion and contraction of the void spaces during processing can be considered when determining how much void space to be incorporated by mixing. Examples of gases that might be entrained within the thermoplastic starch compositions to form a void phase therein include, but are not limited to, air, $CO_2$, nitrogen, noble gases, and the like.

Alternatively, or in conjunction with mechanical incorporation of void spaces, it may be advantageous to use volatile solvents or other liquids that can vaporize and thereby yield void spaces as the thermoplastic starch compositions are heated and/or exposed to reduced pressure. Solvents and other liquids which may be considered to be "volatile" within the scope of the present invention include any liquid or solvent that has a vapor pressure that is significantly greater than 1 bar at the melt temperature of the particular thermoplastic starch composition in question. Examples include water, alcohols (such as methyl, ethyl, isopropyl and the like), ketones (such as acetone, methyl ethyl ketone and the like), aldehydes (such as formaldehyde, acetaldehyde and the like), carboxylic acids (such as formic, acetic acid and the like), acid anhydrides (such as acetic anhydride and the like), esters (such as ethyl acetate and the like), amines, and many other well-known solvents and liquids. Solid nucleating agents may be used in conjunction with volatile liquids to assist in forming discrete and well-formed voids. The solid nucleating agents may comprise water-soaked fibers.

Alternatively, or in conjunction with the foregoing void forming methods, it may be preferable in some cases to use chemically reactive foaming agents. An example of a chemically reactive foaming agent is a mixture of citric acid and bicarbonate, or bicarbonate that has been processed into small particles and coated with wax, starch, or water soluble coatings. Upon heating, the bicarbonate will decompose and yield carbon dioxide gas as a reaction product, which acts to expand the thermoplastic starch composition.

There are a wide variety of lightweight fillers that include significant quantities of void spaces. Thus, to the extent that a substantial fraction of the overall volume of a lightweight filler actually comprises voids, then the lightweight filler technically consists of both a solid phase as well as a void phase when viewed microscopically. Examples of lightweight filler that have substantial void space include, but are not limited to, hollow glass spheres, porous ceramic spheres, perlite, vermiculite, exfoliated geologic materials, and the like. Because such lightweight filler tend to be somewhat fragile, it will be preferable to use low shear mixing when blending such fillers within the thermoplastic starch compositions of the present invention.

Another class of void forming agents include filler particles that are able to expand when heated. For example, an expandable particle may include a volatile liquid surrounded by a plastic or otherwise expandable shell. Upon heating, the volatile liquid undergoes a phase change from a liquid to a gas, which causes its volume to expand. This, in turn, causes the surrounding expandable shell to expand to thereby form a lightweight balloon or sphere. One such expandable particle, available from Akzo-Nobel located in Sweden, comprises an acrylonitrile shell surrounding a core of hexanes or heptanes which, upon heating, forms a lightweight balloon or sphere.

D. Effect of Components on Thermoplastic Starch Compositions While in a Molten State In general, the viscosity and other Theological properties of the thermoplastic starch compositions of the invention while in a molten state will directly relate to the type and amounts of the various components within the composition. Of course, while the thermoplastic starch composition might be "molten" when viewed macroscopically, the thermoplastic starch compositions will generally include both molten and solid components. Typically, the thermoplastic starch compositions while in a melted or molten state will include a generally liquid or plastic thermoplastic phase in a melted or molten state that comprises a continuous phase or matrix and one or more generally solid disperse phases comprising inorganic filler particles and optionally fibers, organic fillers, and other solid components. A void phase comprising gas-filled voids may also be optionally included.

The viscosity of the molten thermoplastic phase itself will be dependent on the viscosity of the thermoplastic starch melt, optional thermoplastic polymers, and other liquid components within the thermoplastic phase while in a molten state. Although the viscosity of the thermoplastic starch melt portion will depend to some degree on the type of plasticizer and starch being used (e.g., the source, such as potato or corn, or the degree to which is has been modified or denatured), the viscosity will especially depend on the amount of plasticizer that is added in relation to the starch content. As more plasticizer is added, the viscosity of the starch melt will typically decrease at a given temperature. In general, adding liquids and additional thermoplastic polymers having viscosities that are lower or greater than that of the starch melt will tend to lower or raise the viscosity of the molten thermoplastic phase, respectively.

In addition, any reactions between the starch, polymer and other components might affect the viscosity of the thermoplastic melt phase. As a general rule, but by no means the absolute rule in every case, reactions that result in polymer molecules having increased molecular weight will tend to increase the viscosity of the thermoplastic melt phase. Thus, cross-linking reactions between the starch molecules themselves or between other components within the thermoplastic starch composition will tend to increase the viscosity of the mixture. Similarly, reactions between the starch molecules and, e.g., the optional synthetic polymers, such as by addition, etherification, esterification, and the like will tend to increase mixture viscosity. On the other hand, hydrolysis or other cleaving reactions will tend to decrease mixture viscosity, all other things being equal.

Because the inorganic filler and optional fibrous components will remain as discrete solids in most cases, and will not undergo a state change or become part of the thermoplastic phase, they will tend to increase mixture viscosity, particularly at higher concentrations. Thus, increasing the concentration of inorganic filler and optional fibrous components will tend to increase the viscosity of the thermoplastic starch compositions. Other factors that will affect mixture rheology include the morphology and specific surface area of the inorganic filler particles and optional fibers. In general, increasing the specific surface area and/or the irregularity of the filler particles and fibers will increase the viscosity since more of the thermoplastic phase will be required to coat and lubricate the inorganic filler particles and fibers. Conversely, decreasing the specific surface area and/or irregularity of the particle and fiber surfaces will decrease the viscosity, all other things being equal.

In addition, increasing the particle packing density of the inorganic filler particles can greatly reduce the viscosity of the molten thermoplastic starch compositions. By way of example, an inorganic filler particle system having a packing density of 0.65 will generally require about 35% by volume of the thermoplastic phase to substantially fill the interstitial space between the particles. On the other hand, a filler particle system having a packing density of 0.95 will generally require only about 5% by volume of the thermoplastic phase to substantially fill the voids. At the point where there is just enough of the thermoplastic phase to fill the void spaces between the filler particles, even slight fluctuations in the concentration of the thermoplastic phase can greatly affect the mixture rheology. In the example herein, a filler having a particle packing density of 0.65 will require seven times the amount of thermoplastic phase as a filler having a particle packing density of 0.95 to roughly achieve the same level of particle lubrication. This clearly shows the potentially substantial effects of particle packing density on mixture rheology.

The inclusion of other admixtures such as dispersants, plasticizers and lubricants can greatly affect mixture rheology. Dispersants such as sulfonyl-based materials greatly decrease the viscosity and increase the workability of the moldable mixture while keeping the amount of thermoplastic phase constant. In addition, water scavengers such as zeolites and hydraulically reactive materials can affect mixture rheology by eliminating water that might otherwise act to lubricate the thermoplastic starch composition and/or that might inhibit condensation reactions between the starch and other polymers within the thermoplastic phase.

Organic fillers can affect mixture rheology in a variety of ways depending on the chemical makeup and physical properties of the organic filler being used. In the case where the organic fillers have a melting point above the softening point or range of the thermoplastic phase such that they will remain essentially as solid particulate material, their effect on mixture rheology will be similar to that of the inorganic filler particles. However, to the extent that the organic filler particles melt or at least soften due to increases in temperature, their viscosity-increasing effect will be lessened. On the other hand, to the extent that the organic filler chemically reacts with the starch and/or other polymer component, the organic filler might tend to further increase the viscosity of the molten thermoplastic starch composition.

Of course, the biggest changes in mixture rheology will occur as a result of state changes of the thermoplastic phase between solid and liquid states due to fluctuations in temperature, particularly in the region of the melting point or softening range of the thermoplastic starch composition.

E. Effect of Components on Properties of Thermoplastic Starch Compositions When Solidified With regard to the final thermoplastic starch composition, important mechanical, chemical, and other properties include tensile strength (in general or along particular vectors), compressive strength, flexibility, modulus of elasticity, ductility, fracture energy, the ability to elongate, deflect or bend, bending endurance, density, permeability to gases and liquids, resistance to water and other liquids, resistance to water vapor and other gases, thermal resistance, and specific heat.

The foregoing properties can be tailored to the particular performance criteria of the final article by altering the identity and relative concentration of the various components within the thermoplastic starch composition. In some cases, higher tensile strength may be an important feature. In others, it may be less significant. Some articles should preferably be more flexible, while others should be more rigid. Some should be relatively dense, while others should be thicker, lighter, and more insulative. The important thing is to achieve a material which has properties appropriate for a particular use, while remaining cognizant of cost and other practical manufacturing parameters. While having "too much" or "too little" of a particular property may be inconsequential from the standpoint of performance, from a cost standpoint it may be wasteful, inefficient or ineffectual to provide too much of a particular property, even if desired up to a certain point.

In general, the overall mechanical properties of a particular thermoplastic starch composition will correlate to the properties of the solidified thermoplastic phase. All things being equal, a thermoplastic phase having superior mechanical properties compared to a different thermoplastic phase will yield a thermoplastic starch composition having superior mechanical properties. Due to the tremendous variety of different thermoplastic starch compositions and starch/polymer blends that may be used in the thermoplastic starch compositions within the scope of the present invention, one of ordinary skill in the art will have an almost limitless supply of possible thermoplastic phases and attendant properties from which to choose. In selecting the optimal thermoplastic phase, one of ordinary skill in art will have to understand the performance criteria of the final articles to be manufactured, the cost parameters, and identities, concentrations and associated properties of the other components within the thermoplastic starch composition. In general, it will be preferred to select a thermoplastic phase that has the lowest cost while having adequate, though not necessarily superior, mechanical, chemical and other properties, compared to other possible thermoplastic phases.

In general, increasing the concentration of polymers that have increasing tensile and other strength properties will increase the strength of the resulting thermoplastic starch composition. The degree of water resistance of the thermoplastic phase will, of course, greatly affect the water resistance of the overall composition. The elasticity and toughness of the thermoplastic phase will have a significant effect on the final composition. Increasing the concentration of plasticizer will typically increase the flexibility and elasticity of the thermoplastic phase. Conversely, decreasing the amount of plasticizer will yield a stiffer, more brittle thermoplastic phase. Thus, the identity and concentration of the plasticizer can greatly affect the final properties of the thermoplastic starch composition. Low volatile plasticizers will tend to yield properties that remain substantially constant over time, while more volatile solvents such as water can evaporate away over time, yielding a thermoplastic starch composition whose mechanical properties may change substantially over time.

The degree of crystallinity of the thermoplastic phase can greatly affect the mechanical properties of the thermoplastic starch composition. In general, the more amorphous the thermoplastic phase, the greater will be the tensile strength, flexibility, ductility, bending endurance, and other like properties of the composition. Conversely, the greater the crystallinity of the thermoplastic phase, the greater will be the stiffness, Young's modulus, rigidity, and other like properties of the composition. In general, increasing the concentration of plasticizer will decrease the crystallinity of the thermoplastic phase, thereby making it more amorphous. In addition, the addition of dissimilar materials, such as additional polymers, blocking agents, and the like within the starch melt will tend to result in a solidified thermoplastic phase that is more amorphous and less crystalline in nature.

All things being equal, for a given thermoplastic phase, increasing the concentration of the inorganic filler component will tend to decrease the tensile strength, reduce the flexibility, increase the stiffness, increase the compressive strength, decrease the ductility, and decrease the fracture energy of the resulting thermoplastic starch composition. The effect of the inorganic filler on the density will usually depend on the relationship between the density of the filler and the thermoplastic phase. Because most of the less expensive inorganic fillers have a density that is typically greater than most thermoplastic phases, increasing the inorganic filler content will generally increase the density of the thermoplastic starch composition. However, certain lightweight fillers can actually lower the density of the thermoplastic starch composition. Lightweight fillers will also generally lower the thermal conductivity and specific heat of the thermoplastic starch composition, while the effect of other inorganic fillers on such properties is variable.

Because the general effect on desirable strength and other mechanical properties by adding the inorganic filler can be negative, such negative effects can be offset by adding reinforcing fibers. Of course, fibers may also be added to impart these and other properties independent of the inorganic filler. In general, including more fibers will tend to increase the tensile strength, flexibility, compressive strength, tear and burst strength, ductility, fracture energy, and modulus of elasticity of the resulting thermoplastic starch composition. In general, using longer, more flexible fibers will generally impart more flexibility to the thermoplastic starch composition compared to shorter, stiffer fibers. In order to obtain the advantageous properties of different types of fibers, it may be preferable in some cases to combine two or more different kinds of fibers within the thermoplastic starch composition. It should also be understood that shaping processes, such as extrusion and rolling, will tend to orient the fibers in the direction of elongation of the thermoplastic starch composition. This may be advantageous in order to maximize, e.g., the tensile strength, flexibility, and bending endurance of the resulting article in a certain direction.

Finally, other admixtures within the thermoplastic starch composition such as cross-linking agents, lubricants, humectants, plasticizers, hydroxyl blocking groups, and the like can greatly affect the final properties, such as resistance to water or other liquids, impermeability to water vapor or other gases, ductility and strength.

The thermoplastic starch compositions formed using the compositions described herein will preferably have a tensile strength in the range from about 0.1 MPa to about 500 MPa, and more preferably in the range from about 5 MPa to about 200 MPa.

III. Manufacturing Thermoplastic Starch Compositions and Articles Therefrom

A. Formation of Molten Thermoplastic Starch Compositions

In order to manufacture thermoplastic starch compositions according to the present invention, it is first necessary to create a thermoplastic melt of the thermoplastic starch composition. A preferred method for manufacturing thermoplastic starch compositions according to the present invention includes: (1) causing the starch component to behave in a thermoplastic manner to form in an initial thermoplastic phase; (2) optionally blending one or more additional polymers and/or other materials with the starch melt to form multicomponent thermoplastic phase; (3) mixing the solid phases including the inorganic filler phase, optional fibrous phase, and other optional solid phases into the thermoplastic phase; (4) optionally forming a void phase; (5) shaping the thermoplastic starch composition while in a melt state; and (6) allowing the molten starch composition to cool below the softening point or range and thereby form a solid article of manufacture. The foregoing sequence is illustrative but not limiting, and the components may be blended together in any order so long as the resulting thermoplastic starch composition has the desired characteristics. Moreover, the composition may be solidified into beads and then remelted prior to final shaping into the desired article.

1. Creating a Starch Melt

In order to form a starch melt, it is necessary to heat native ungelatinized starch granules in the present of a plasticizer, preferably in the presence of significant shearing forces to thoroughly blend the plasticizer and starch granules together during the melt procedure. As set forth above, a wide variety of different starches and starch derivatives may be used within the thermoplastic starch compositions of the present invention. Moreover, a wide variety of plasticizers can be used to lower the melting point of starch so that it can form a melt instead of decomposing, which will occur if one were to attempt to form a starch melt by heating in the absence of a plasticizer.

The type of plasticizer that is used can greatly affect the properties of the resulting thermoplastic starch melt. Moreover, using predried starch in which a substantial portion of water naturally found in the starch granules has been removed prior to formation of the starch melt can have a beneficial effect, particularly where it is desired for the starch to undergo a condensation reaction with another thermoplastic polymer or other material in the thermoplastic starch composition. A detailed description of preferred methods for forming a starch melt using either native or pre-dried starch is set forth in U.S. Pat. No. 5,362,777 to Tomka. In the case of native starch, water is removed during the process of mixing the starch and plasticizing additive together according to Tomka. A number of other patents teach useful methods for forming thermoplastic starch melts using an initial quantity of water and one or more less volatile plasticizers, wherein water is removed during processing while in a melt phase by degassing, including U.S. Pat. No. 5,412,005 to Bastioli et al. Finally, U.S. Pat. No. 5,095,054 to Lay et al. discloses processes for forming a destructurized starch melt using water as the primary melting aid. Although the foregoing patents disclose varying plasticizers and thermoplastic polymers that may be blended with the starch melts, each of the patents discloses useful process conditions for forming a starch melt. For purposes of disclosing a range of processes for forming a starch melt, the patents identified in this paragraph are incorporated herein by specific reference.

Depending on the identities and concentrations of both the starch and plasticizer components, it is possible to create a molten starch material within a wide range of temperatures. As a general rule, increasing the ratio of plasticizer to starch will tend to decrease the temperature at which the starch/plasticizer mixture will become molten. Conversely, increasing the starch to plasticizer ratio will tend to increase the temperature at which starch can be melted. Selecting the optimal ratio of starch and plasticizer will depend on a number of factors, including the desired melt temperature, desired rheology of the molten starch melt, and the desired final properties of the thermoplastic starch composition. Including more of the plasticizer initially, particularly if it cannot later be removed by, e.g., evaporation, will further tend to yield a softer, more flexible thermoplastic starch composition. When selecting the amount of plasticizer to add, enough plasticizer should be added in order to prevent the melting point or softening range from being so high as to risk excessive decomposition of the starch during the melt process. On the other hand, the melting point or softening range of the resulting starch melt should not be so low so as to yield a thermoplastic starch composition that will become inappropriately soft or molten during the useful life of articles manufactured therefrom. In general, the intended use for the article to be manufactured from the thermoplastic starch composition can help determine the lower limit of melt temperatures that would be appropriate. The intended use may also help determine the targeted glass transition temperature or range, which can be adjusted, for example, by selecting an appropriate polymer to be added to the thermoplastic starch composition having a glass transition temperature within a desired range.

In view of the foregoing, the starch/plasticizer mixtures within the scope of the present invention will preferably form a melt at a temperature (or range of temperatures) in a range from about 70° to about 240° C., more preferably in a range from about 80° C. to about 220° C., and most preferably from a range from about 100° C. to about 200° C.

In the case where a substantial amount of water is used as a plasticizing agent, it will typically be necessary to maintain the starch melt within a closed vessel in order to prevent evaporation of the water and premature solidification of the starch melt. Nevertheless, it may be preferable in many cases to vent some or all of the water, particularly where a low volatile plasticizer is used, in order to reduce or eliminate the water altogether. In the case where a sufficient quantity of a low volatile plasticizer is used, it may not be essential for the starch melt to remain within a closed vessel. Thus, virtually any mixing apparatus capable of imparting the requisite shear can be used within the scope of the invention. These include Hobart mixers, high energy cement mixers, potato mixers, and the like. Nevertheless, a preferred mixing apparatus will comprises the interior of single and multiple auger extruders.

Preferable auger extruders include multiple ports for introducing various ingredients, multiple chambers for mixing the various ingredients at different stages of the mixing process, one or more heating zones in order to raise the temperature of the thermoplastic starch melts to one or more temperatures, and an optional degassing chamber that can be used to release unwanted volatiles, such as water vapor. There are a wide variety of extruders that may be used, including most extruders used in the plastics and ceramic industries, with or without modification. One of ordinary skill in the art will be able to select and optionally modify any known extruder used in the art to provide adequate processing conditions. A preferred apparatus for manufacturing starch melts and compositions therefrom may be found in U.S. Pat. No. 5,525,281 to Lörcks, et al. For purposes of disclosing suitable mixing and processing apparatus for forming thermoplastic starch compositions within the scope of the present invention, the foregoing patent is incorporated herein by specific reference.

Suitable mixing apparatus that can be used to form starch melts include: a twin-shafted kneader with meshing screws having kneading blocks sold by the Buss Company; a Brabender mixer; a Theysohn TSK 045 compounder, which is a twin-shaft extruder with shafts rotating in the same direction and which has multiple heating and processing zones; a Buss Ko-Kneader having a heatable auger screw; Baker-Perkins MPC/V-30 double and single auger extruder; single and twin auger OMC extruders; Model EPV 60/36D extruder; BATTAGGION ME100 direct-current slow mixer; and a HAAKE Reomex extruder.

2. Blending Additional Polymers and Liquids to Form the Thermoplastic Phase

As set forth above, one or more natural or synthetic polymers may be added to the starch melt in order to improve the properties of the thermoplastic starch compositions, particularly in the solid state. In addition, other materials such as liquids, solids, and gases can be dissolved or otherwise incorporated into the thermoplastic phase in order to further improve the properties thereof. Such other polymers and materials will preferably be added to the starch after the starch has at least partially formed a melt in order that the starch and optional polymers and other materials can then be substantially homogeneously mixed together. Typically, the thermoplastic phase will be subjected to high shear conditions within an appropriate mixer. Where it is desired for the process to be continuous, the same apparatus used to form the starch melt may be used to blend the other components therein. More preferably, the mixing apparatus will comprise an auger extruder as discussed above. Multi-chamber extruders advantageously allow for the addition of different materials downstream from where previous materials have been added, melted and blended in order to form a continuous and dynamic mixing process that takes advantage of the proper order of mixing selected components together.

In many cases it will be advantageous for the starch and one or more synthetic polymers to undergo a condensation reaction (or other type of reaction) in order to chemically interlink at least a portion of the starch with at least a portion of one or more additional polymers. Such chemical linking yields a more homogeneously mixed thermoplastic phase having more uniform properties. In addition, reacting the starch and other polymer(s) creates greater strength by virtue of the formation of a larger number of chemical bonds throughout the thermoplastic phase. Additional cross-linking agents, chain extenders and reactants may also be added in order to further improve the properties of the thermoplastic phase.

In order to assist in the promotion of condensation reactions between the starch and other components, it will be preferable to minimize the amount of water within the thermoplastic phase melt. As set forth above, a preferred method of doing this is to use starch that has been pre-dried to remove a substantial portion of the water inherently bound within native starch, which is typically about 10–20%. Preferred pre-dried starch will have a water content less than about 10%, more preferably less than about 5%, and most preferably less than about 3% by weight of the starch.

In order to further reduce the moisture content beyond that which may be removed by way of pre-drying the starch, the mixing apparatus may be equipped with a venting chamber or other degassing means for further venting or degassing water in a vapor form during processing. Since the thermoplastic phase will typically melt at a temperature higher than the boiling point of water, water vapor can be advantageously removed by means of venting. Moreover, because there is some reason to believe that starch thermodynamically prefers associating with glycerin, sorbitol and other plasticizing liquids compared to water, it may be easier to remove water during processing compared to pre-drying the starch, particularly without damaging the starch. In addition, venting or degassing can be employed to remove any moisture that may be produced by way of condensation reactions between starch and other components during the formation of the thermoplastic starch composition.

In the case where condensation reactions are dynamically occurring throughout the thermoplastic melt phase, it is possible that farther water may be produced as a by product. Removal of this water of condensation and any residual water within the pre-dried starch can assist in driving the desired condensation reaction in the forward direction in order to more fully react the starch and the synthetic thermoplastic components.

In the case where water is removed by degassing or venting of the thermoplastic starch composition during processing, it will be preferable to remove water so that the composition includes less than about 5% water by weight of the combined starch, plasticizer and water content while in a melted state, more preferably less than about 3% by weight, and most preferably less than about 1% by weight while in a melted state. As will be discussed below, upon cooling the melt, such as by means of water, the quenched melt will tend to reabsorb moisture. However, moisture that is reabsorbed is loosely bound in the sense that it is believed not to become interposed between the starch molecules as are the water or other plasticizer that is mixed with the starch while in a molten state. As such, this loosely bound water does not participate in the thermoplastic starch on a molecular level in the same way that "integrated" water or plasticizer is involved, and the transient nature of such moisture and its tendency to migrate into or out of the thermoplastic starch composition does not yield retrograde or crystalline starch as does the migration of "integrated water" out of destructurized starch.

Because it is certainly within the scope of the present invention to utilize thermoplastic polymers that do not undergo condensation reactions with the starch component, or that do not react at all with the starch, it will not be necessary in every case to use pre-dried starch and/or vent water from the thermoplastic phase melt. Of course, to the extent that water vapor might damage the mechanical integrity of the thermoplastic starch compositions upon exiting from the extruder barrel, it will certainly be preferable to remove any deleterious amounts of water vapor.

In most cases, it will be preferable to blend the starch and one or more additional polymers with sufficient shear and for a sufficient length of time to yield a substantially homogeneous mixture. Because the starch molecules and other thermoplastic polymer molecules are relatively large in size, the resulting thermoplastic phase will typically comprise multiple subphases of two or more different types of polymers. As a general rule, the more cross linking bonds there are between the various polymer molecules of the different subphases the greater will be the strength and uniformity of mechanical properties of the thermoplastic starch composition.

In those cases where the melting point or softening range of the thermoplastic starch melt is higher than the melting point or softening range of the optionally added polymers, it will usually not be necessary to further increase the temperature of the thermoplastic phase in order to cause the other polymers to melt. On the other hand, in those cases where the temperature of the starch melt is significantly lower than the melting point or softening range of the one or more added polymers, it may be necessary to increase the temperature that is applied to the thermoplastic melt in order to obtain a homogeneously blended melt. Nevertheless, it is certainly within the scope of the present invention to only partially melt one or more components of the thermoplastic phase if desired. Moreover, it may be possible in some cases for a polymer blend to have an overall melting point or softening range that is lower than the melting point or softening range of the individual polymers.

3. Addition of Solid Phases

A wide variety of solid phases such as one or more inorganic fillers and optional fibrous and organic fillers can be added to the thermoplastic starch compositions. In the event that fibers are added, it will generally be preferable to add the fibers to the thermoplastic phase melt prior to the addition of the inorganic filler, since fibers generally require greater shearing action than inorganic fillers to become homogeneously mixed. The thermoplastic phase will preferably have a viscosity that is sufficient to transfer the shearing action of the mixing apparatus down to the fiber level in order to separate the fibers and homogeneously disperse them throughout the thermoplastic phase.

Because the inorganic filler components will generally comprise particulate fillers that are generally easier than fibers to disperse throughout the thermoplastic phase, blending such fillers will require much less shear compared to the blending of the fibrous materials. Moreover, because the inorganic filler component will generally be far more abrasive than the other components that may be added to the composition, it may be advantageous to use less shear in order to protect the components of the mixing apparatus. Nevertheless, any degree of shear can be used so long as it yields a thermoplastic composition and does not unduly damage the mixing apparatus.

In those cases where fragile inorganic fillers are included, such as lightweight fillers that include significant void spaces, excessively high shearing forces can cause such fillers to break and be ground into a finer powder, which would thereby destroy the lightweight and/or insulating effect of such materials.

Organic filler components may generally be added at any time either before or after the addition of the inorganic filler. It should be understood, however, that certain specific components may be best blended in specific orders and sequences under certain optimal mixing conditions. One of ordinary skill in the art will know how to optimize the mixing order and mixing conditions in order to obtain thermoplastic starch compositions having desired properties, both in the melt state and in the solid state.

4. Forming Optional Void Phase

In those instances where it may be desired to incorporate a void phase, a wide variety of different techniques may be used to introduce voids, such as the use of mechanical means, blowing agents, nucleating agents, chemical expansion agents, expandable particles, and the like. Void forming agents may be added at any time during the manufacture of the thermoplastic phase, either before, during or after the addition of the solid phases. In general, it will be advantageous for the blowing agent to have its maximum expansion effect during the molding process in which the final articles are formed. Nevertheless, voids may be introduced during the mixing process, molding process, or during a post molding process in which a final article is heated to a temperature sufficient to cause the thermoplastic phase to become at least partially molten while simultaneously triggering some kind of expansion agent to form void spaces within the molded article.

B. Shaping of Molten Thermoplastic Starch Compositions

Once the thermoplastic starch compositions have been processed into a molten state, they may be shaped into a huge variety of articles using any known shaping means known in the art for plastic materials. Moreover, many shaping procedures used to form other materials such as ceramics may be modified and used to mold the thermoplastic starch compositions, particularly those that include a relatively high concentration of inorganic filler.

In many cases it will be desirable to first form the thermoplastic starch compositions into a granulate or bead by extruding the initially formed thermoplastic starch compositions through a die to form an extruded strand, which is thereafter cooled in a water bath, and then chopped into individual pieces. Such pieces may be stored, transferred and then used as desired in the manufacture of a wide variety of articles. Alternatively, the molten thermoplastic starch compositions can be immediately molded into the desired final articles.

Cooling an extruded strand with water prior to formation of a granulate will tend to cause a net absorption of water in the granulate. The absorption of water begins at the moment the extrudate is cooled or quenched in water, and continues so long as the strand or granulates are moist and/or exposed to relatively humid ambient conditions. Of course, water that is reabsorbed should be understood to be "loosely bound" in the sense that once the thermoplastic starch phase has solidified, the absorbed water is only absorbed superficially and is not believed to become incorporated substantially within and between the starch molecules in the same manner as the water and/or plasticizer that is mixed with the starch while in a melted state. In general, thermoplastic starch compositions that are cooled with water will absorb from about 1% to about 6% by weight of loosely bound water.

Appropriate molding processes used to form the thermoplastic starch compositions of the invention into desired articles include blow molding, film blowing, injection molding, die press molding, rolling or calendering to form sheets, vacuum forming, including vacuum forming of sheets and films, extrusion, hot pressing, laminating, coating, and virtually any other known molding technique. A preferred blow-molding apparatus is an AEMME-200 blow-molding apparatus.

In most cases, the shaping process also includes cooling the shaped thermoplastic starch composition to below its melting point or softening range in order to yield a solidified article. Depending on the type of article being manufactured, as well as the intended use of the article, it may be preferable to control the degree of crystallinity of the solidified thermoplastic phase. In most cases, the type and quantity of plasticizer and other polymers blended with the starch component will have the greatest effect on the crystallinity of the thermoplastic phase, as discussed more fully above. Nevertheless, it may also be possible to affect the degree or percentage of crystallinity by controlling the rate at which the shaped thermoplastic starch compositions are cooled.

As with other polymers, the degree of crystallinity of the starch molecules and other polymers within the thermoplastic phase may be increased if the molten thermoplastic starch compositions of the present invention are cooled more slowly. For example, if a starch melt is cooled slowly so that its temperature is maintained within the softening range for a relatively long time, the molecules may be allowed to rearrange themselves into a lower energy crystalline state. On the other hand, cooling a starch melt more quickly will tend to maintain the solidified product in a more amorphous, and less crystalline state.

Controlling the degree of crystallinity by means of controlling compositional as well as processing variables, may be helpful in engineering a final product having desired properties. On the one hand, solidified thermoplastic starch compositions that have lower crystallinity and which are more amorphous will generally have greater tensile strength, flexibility, bending endurance, and will behave like a wide variety of conventional thermoplastic polymers. On the other hand, such compositions will generally be more sensitive to heat over a wider range of temperatures. Thus, more highly crystalline thermoplastic compositions may be more suited for the manufacture of articles that need to be more heat-resistant, such as microwavable containers. Because more amorphous compositions tend to soften at lower temperatures due to such polymers having a wider softening range compared to crystalline polymers which have a more distinct melting point, they may have the tendency to soften when heated in a microwave oven. In contrast, compositions having a greater degree of crystallinity will tend to remain more rigid until heated to even higher temperatures and for longer periods of time compared to more amorphous polymers. The same is true for more amorphous polymers that are cooled to or below their glass transition temperature.

As stated above, preferred melting points or softening ranges for the thermoplastic starch compositions of the present invention are in a range from about 70° C., to about 240° C., more preferably in a range from about 80° C. to about 220° C., and most preferably in a range from about 100° C. to about 200° C.

C. Post-Formation Processing

Once an appropriate article has been formed from the inventive thermoplastic starch compositions, it may be further processed in order to obtain the desired mechanical or physical properties. Post-formation processes include conversion of one article into another, such as the formation of containers or other articles from sheets, remelting, coating, monoaxial and biaxial stretching of sheets, lamination with one or more other sheets or films, corrugation, creping, parchmenting, scoring and perforation of sheets, printing, expansion, and virtually any other known post-formation process.

Coatings that may be used with the thermoplastic starch compositions of the present invention include paraffin (synthetic wax); shellac; xylene-formaldehyde resins condensed with 4,4'-isopropylidenediphenolepichlorohydrin epoxy resins; polyurethanes; drying oils; reconstituted oils from triglycerides or fatty acids from the drying oils to form esters with various glycols (butylene glycol, ethylene glycol), sorbitol, and trimethylol ethane or propane; synthetic drying oils including polybutadiene resin; natural fossil resins including copal (tropical tree resins, fossil and modern), damar, elemi, gilsonite (a black, shiny asphaltite, soluble in turpentine), glycol ester of damar, copal, elemi, and sandarac (a brittle, faintly aromatic translucent resin derived from the sandarac pine of Africa), shellac, Utah coal resin; rosins and rosin derivatives including rosin (gum rosin, tall oil rosin, and wood rosin), rosin esters formed by reaction with specific glycols or alcohols, rosin esters formed by reaction formaldehydes, and rosin salts (calcium resinate and zinc resinate); edible oils; phenolic resins formed by reaction of phenols with formaldehyde; polyester resins; epoxy resins, catalysts, and adjuncts; coumarone-indene resin; petroleum hydrocarbon resin (cyclopentadiene type); teipene resins; urea-formaldehyde resins and their curing catalyst; triazine-formaldehyde resins and their curing catalyst; modifiers (for oils and alkyds, including polyesters); vinyl resinous substances (polyvinyl chloride, polyvinyl acetate, polyvinyl alcohol, etc.); cellulosic materials (carboxymethylcellulose, cellulose acetate, ethylhydroxyethylcellulose, etc.); styrene polymers; polyethylene and its copolymers; acrylics and their copolymers; methyl methacrylate; ethyl methacrylate; waxes (paraffin type I, paraffin type II, polyethylene, sperm oil, bees, and spermaceti); melamine; polyamides; polylactic acid, Biopol® (a polyhydroxybutyrate-hydroxyvalerate copolymer), polycaprolactone and other aliphatic polyesters; aliphatic-aromatic copolyesters; soybean protein; latexes; polyacrylates; other synthetic polymers including biodegradable polymers; and elastomers and mixtures thereof. Appropriate inorganic coatings include sodium silicate, calcium carbonate, aluminum oxide, silicon oxide, kaolin, clay, ceramic and mixtures thereof. The inorganic coatings may also be mixed with one or more of the organic coatings set forth above.

Of course, it should be understood that the thermoplastic starch compositions of the present invention may themselves be used as coating materials in order to form a synergistic composite with, or otherwise improve the properties of, any number of other materials. Such disparate materials such as paper, paperboard, molded starch-bound articles such as starch-based foams, metals, plastics, concrete, plaster, ceramics, and the like can be advantageously coated with a thermoplastic starch composition.

D. Articles Made From Thermoplastic Starch Compositions

Due to the wide variety of properties that may be microstructurally engineered into the thermoplastic starch compositions of the present invention, it is possible to manufacture a wide variety of finished articles that may presently be made plastics, paper, paperboard, polystyrene, metals, ceramics, and other materials. Merely by way of example, it is possible to manufacture the following exemplary articles: films, bags, containers, including disposable and nondisposable food or beverage containers, cereal boxes, sandwich containers, "clam shell" containers (including, but not limited to, hinged containers used with fast-food sandwiches such as hamburgers), drinking straws, plastic baggies, golf tees, buttons, pens, pencils, rulers, cassette tape boxes, CD containers, cassette tapes, business cards, toys, tools, Halloween masks, building products, frozen food boxes, milk cartons, fruit juice containers, yoghurt containers, beverage carriers (including, but not limited to, wraparound basket-style carriers, and "six pack" ring-style carriers), ice cream cartons, cups, french fly containers, fast food carryout boxes, packaging materials such as wrapping paper, spacing material, flexible packaging such as bags for snack foods, bags with an open end such as grocery bags, bags within cartons such as a dry cereal box, multiwall bags, sacks, wraparound casing, support cards for products which are displayed with a cover (particularly plastic covers disposed over food products such as lunch meats, office products, cosmetics, hardware items, and toys), computer chip boards, support trays for supporting products (such as cookies and candy bars), cans, tape, and wraps (including, but not limited to, freezer wraps, tire wraps, butcher wraps, meat wraps, and sausage wraps); a variety of cartons and boxes such as corrugated boxes, cigar boxes, confectionery boxes, and boxes for cosmetics; convoluted or spiral wound containers for various products (such as frozen juice concentrate, oatmeal, potato chips, ice cream, salt, detergent, and motor oil), mailing tubes, sheet tubes for rolling materials (such as wrapping paper, cloth materials, paper towels and toilet paper), and sleeves; printed materials and office supplies such as books, magazines, brochures, envelopes, gummed tape, postcards, three-ring binders, book covers, folders, and pencils; various eating utensils and storage containers such as dishes, lids, straws, cutlery, knives, forks, spoons, bottles, jars, cases, crates, trays, baking trays, bowls, microwaveable dinner trays, "TV" dinner trays, egg cartons, meat packaging platters, disposable plates, vending plates, pie plates, and breakfast plates, emergency emesis receptacles (i.e., "barf bags"), substantially spherical objects, toys, medicine vials, ampules, animal cages, firework shells, model rocket engine shells, model rockets, coatings, laminates, and an endless variety of other objects.

IV. EXAMPLES OF THE PREFERRED EMBODIMENTS

The following examples are presented in order to more specifically teach compositions and process conditions for forming the thermoplastic starch compositions according to the present invention, as well as articles therefrom. The examples include various mix designs, as well as various processes for manufacturing thermoplastic starch compositions, including sheets, films, pellets, containers, and other articles of manufacture.

U.S. Pat. No. 5,736,209 to Andersen et al., discloses compositions and methods for manufacturing a wide variety of sheets that include starch as the primary binder, a cellulosic ether as a secondary film-forming binder, inorganic fillers up to 90% by weight, and fibers. Such sheets are manufactured from aqueous starch-based mixtures that generally include sufficiently large quantities of water such that the resulting aqueous starch-based mixture will not behave as a thermoplastic material—such starch-based mixtures being liquid or gel-like at room temperature. Therefore, the sheets made from these starch-based mixtures are typically made by passing the mixture between one or more sets of heated sheet-forming rollers which remove a substantial portion of the water by evaporation in order to cause the starch and cellulosic ether binders to resolidify and thereby form a solid sheet.

More recently the inventors discovered that sheets made according to U.S. Pat. No. 5,736,209, when made to include glycerin and/or sufficient residual moisture, could be subsequently reheated and reshaped and, thus, caused to behave in a thermoplastic manner. It was observed that such sheets could be heated to the point that they become softened and somewhat plastic or flowable, which allowed the sheets to be reshaped and then resolidified in the new shape by cooling. Because many of such sheets included significant to substantial quantities of an inorganic filler (e.g., calcium carbonate), it was thereby discovered that compositions that included starch, glycerin and/or water in plasticizing quantities, a cellulosic ether as an auxiliary polymer, calcium carbonate as an inorganic filler, and fibers as reinforcement could be processed in a thermoplastic manner.

Incorporated Example Set I

The following examples from U.S. Pat. No. 5,736,209 are expressly incorporated herein by specific reference as examples of starch-containing compositions that have been found to exhibit thermoplastic behavior: Examples 5, 10, 11, 28, 29, 33–35 and 46–48. Although the sheets were manufactured from aqueous starch-based mixtures that themselves do not behave in a thermoplastic manner, the resulting sheets made by evaporating a substantial portion of the water from the initial aqueous mixtures did, in fact, exhibit thermoplastic behavior when subsequently reheated so as to form a melt. In view of the foregoing, the final sheets and their associated compositions of Examples 5, 10, 11, 28, 29, 33–35 and 46–48 of U.S. Pat. No. 5,736,209, provide actual working examples of compositions that, when subsequently reheated to form a melt, yield thermoplastic starch compositions within the scope of the present invention. The reason why the starch was able to behave in a thermoplastic manner was believed to be due to the inclusion of glycerin within the mixtures disclosed in these examples. The glycerin in the final hardened sheets, either alone or in combination with residual water, acted as a plasticizer that lowered the melt temperature of the starch to below the decomposition temperature of the starch, thus causing the starch to become thermoplastic.

More particularly, starch-bound sheets made generally according U.S. Pat. No. 5,736,209 were passed between a pair of rollers which were configured to exert a pressure of about 60 bars and which were heated to 180° C. The starch-bound sheets were initially generally opaque, which is characteristic of more highly crystalline retrograde starch formed by removing water by evaporation from gelatinized starch. However, upon being passed between the rollers, the sheet became transparent, which is more characteristic of starch that has undergone a melt so as to become more highly amorphous and less crystalline. In addition, the starch-bound sheet turned from a solid state to a molten thermoplastic starch material, which tended to deposit itself on the rollers since the process was experimental and in no way optimized. Nevertheless, the process demonstrated that even retrograde starch formed by the more inexpensive methods described in U.S. Pat. No. 5,736,209 could be subsequently formed into thermoplastic starch when reheated in the presence of glycerin.

In addition to the foregoing examples, one could certainly modify the remaining examples of U.S. Pat. No. 5,736,209 to include glycerin in an amount sufficient to plasticize the starch binder and allow it to behave in a thermoplastic manner. Alternatively, sheets formed from starch-based mixtures that did not initially include any glycerin or other non-volatile plasticizer could be treated with glycerin after formation of the sheets in order for the glycerin to contact the starch within the sheets. Finally, to the extent that the examples do not include any inorganic filler, they could certainly be modified to include an inorganic filler in an amount within the ranges disclosed herein. In view of this, the remaining examples set forth in U.S. Pat. No. 5,736,209 are incorporated by specific reference with the understanding that the compositions disclosed therein are to be modified to include a sufficient quantity of a low volatile plasticizer and/or water to render the starch thermoplastically processible, and in addition to include an inorganic filler within the ranges disclosed herein.

Incorporated and Modified Example Set II

The modified sheets of Incorporated Example Set I are instead chopped into small pieces and then fed into an auger extruder that is able to apply sufficient heat and shear so as to create melts from the various starch-based compositions defined in Incorporated Example Set I. The thermoplastic melts are able to be shaped into a wide variety of articles using many known processes used in the thermoplastic and ceramic arts and then cooled to yield final solidified articles.

Incorporated and Modified Example Set III

The aqueous starch-based mixtures used to form the sheets set forth in each of the examples of U.S. Pat. No. 5,736,209 are modified by eliminating some or all of the water and instead including a sufficient amount of a low volatile plasticizer (such as glycerin, sorbitol, or a mixture thereof) in an amount in a range from about 3% to about 50% by weight of the starch component. An inorganic filler material is also included in an amount of at least 5% by weight of the overall compositions. These compositions are fed into the barrel of an auger extruder where they are exposed to sufficient heat and shear in order for the starch and non-volatile plasticizer to interact together to form a starch melt. The cellulosic ether also behaves in a thermoplastic manner when mixed with the starch melt under high shear so as to form a multi-component thermoplastic phase melt.

The resulting molten thermoplastic starch composition is extruded through a die into one or more continuously formed strands, which are cooled by passing the one or more strands through a cooling bath. After becoming substantially solidified, the strands are chopped into individual pieces, such as pellets, which can be stored, transported and then further processed and shaped into a wide variety of articles by reheating the thermoplastic starch composition pellets.

Alternatively, the molten thermoplastic starch composition is directly shaped into a desired article, thus eliminating the intermediate step of forming strands and pellets.

The examples that are set forth hereinafter constitute hypothetical examples that are based upon actual mix designs that have been tested or which would be reasonably believed to be processible in a thermoplastic manner based upon actual mix designs and the knowledge learned therefrom. Although hypothetical in nature, the following examples are nonetheless to be considered to be filly enabling of thermoplastic starch compositions within the scope of the present invention.

Example 1

A thermoplastic starch composition is formed from the following components (expressed in terms of parts by weight):

| | | |
|---|---|---|
| starch | 100 | parts |
| glycerin | 15 | parts |
| sorbitol | 15 | parts |
| poly-ε-caprolactone | 130 | parts |
| calcium carbonate | 260 | parts |

The starch, which comprises a native potato starch having an initial moisture content of 17% by weight, glycerin and sorbitol are blended for 1 minute within a barrel of a twin-auger extruder at a temperature of 160–180° C. in order to form thermoplastic starch melt. This melt is degassed in order to reduce the absolute moisture content to below about 5% by weight of the starch, preferably to below about 3%, and most preferably to below about 1%. Thereafter, the starch melt is blended with the poly-ε-caprolactone (PCL) for an additional minute and heated at a temperature of 170° C. in order to form a substantially homogeneous thermoplastic phase comprising thermoplastic starch and poly-ε-caprolactone. At least a portion of the thermoplastic starch (TPS) and (PCL) undergo cross-esterification to thereby form a TPS/PCL copolymer. The TPS/PCL copolymer results in a more homogeneous dispersion of the remaining TPS and PCL. The calcium carbonate is then added to the thermoplastic phase melt and mixed for a minute or less in order to form a substantially homogeneously blended inorganically filled thermoplastic starch composition. This composition is extruded through a die to form a continuous strand of material that is drawn through a cooling water bath in order to form a solidified strand, which is then chopped into individual pieces. These pieces are then reshaped as desired into any one of a variety of articles using molding techniques known in the thermoplastic industry. The articles made therefrom include approximately 50% by weight calcium carbonate, 25% poly-ε-caprolactone, and 25% thermoplastic starch. These articles were moderately stiff and exhibited properties similar to relatively stiff plastic articles known in the art.

Examples 2–19

The composition and process set forth in Example 1 are repeated except that the amount of calcium carbonate added to the thermoplastic starch composition is altered to yield compositions having the following concentrations of calcium carbonate:

| Example | CaCO₃ (wt %) | Example | CaCO₃ (wt %) |
|---|---|---|---|
| 2 | 5% | 11 | 55% |
| 3 | 10% | 12 | 60% |
| 4 | 15% | 13 | 65% |
| 5 | 20% | 14 | 70% |
| 6 | 25% | 15 | 75% |
| 7 | 30% | 16 | 80% |
| 8 | 35% | 17 | 85% |
| 9 | 40% | 18 | 90% |
| 10 | 45% | 19 | 95% |

As the concentration of calcium carbonate is decreased the resulting thermoplastic starch compositions have increased flexibility, tensile strength, toughness and fracture energy, but somewhat lower tensile strength. Conversely, as the concentration of calcium carbonate is increased the resulting thermoplastic starch compositions have increased stiffness, are more brittle, have somewhat increased compressive strength, but are far less expensive due to the greatly reduced materials costs. There are numerous applications in which plastics having a wide variety of mechanical properties, such as strength and stiffness, are appropriate and even desired over plastics having other strength and stiffness properties. Although the compositions having 95% by weight calcium carbonate are extremely brittle and have virtually no flexibility and minimum toughness, an example of an article that could be made therefrom is a "clay pigeon" or other frangible target used for target practice.

Examples 20–24

Thermoplastic starch compositions are formed from the following components (expressed as parts by weight).

| Example | Starch | Water | Clay |
|---|---|---|---|
| 20 | 90 parts | 10 parts | 10 parts |
| 21 | 90 parts | 10 parts | 30 parts |
| 22 | 80 parts | 20 parts | 100 parts |
| 23 | 80 parts | 20 parts | 200 parts |
| 24 | 77 parts | 23 parts | 500 parts |

The starch that is used comprises any native starch. The starch, water and clay are blended in the barrel of an auger extruder under temperature and controlled pressure so as to form a starch melt into which is mixed the various concentrations of clay. The clay-containing starch melt is die molded into a series of disc-shaped objects. At lower concentrations of clay, the resulting disc has increased tensile strength, toughness, and fracture energy. As the amount of clay is increased, the resulting discs become more brittle and fragile but also far less expensive. Such discs could be used for a variety of purposes such as coasters to set drinks thereon, poker chips, targets, etc.

Example 25

Example 1 is repeated in every respect except that pre-dried starch having an initial water content below about 1% by weight is used instead of native starch. The resulting melt formed from the starch, plasticizer and PCL does not require significant degassing to remove excess water vapor.

Example 26

Example 1 is repeated in every respect except that a portion of the calcium carbonate is replaced with a zeolite that is capable of scavenging water in an amount such that a substantial portion of the water initially found within the native starch is absorbed by the zeolite and thereby removed from the thermoplastic phase. This allows for a greater tendency of the starch and PCL to undergo a condensation reaction in order to form a copolymer therefrom.

Examples 27–38

Any of the foregoing examples is modified by replacing some or all of the thermoplastic polymer with one or more of the following types of polymers to form a multi-component thermoplastic phase.

| Example | Polymer |
|---|---|
| 27 | polyethylene |
| 28 | ethylene-vinyl alcohol copolymer |
| 29 | polylactic acid |
| 30 | aliphatic-aromatic copolyester including 1,4-butandioladipinic acid and teraphthalic acid with a chain extender comprising isocyanate |
| 31 | cellulose acetate |
| 32 | cellulosic ether |
| 33 | polyester |
| 34 | polyamide |
| 35 | polyvinylpyrillidone |
| 36 | polyacrylic acid |
| 37 | collagen |
| 38 | sunflower protein |
| 39 | sunflower protein |
| 40 | soybean protein |
| 41 | gelatin |

Examples 42–47

Any of the foregoing examples are modified by including the following amounts of a fibrous component, such as a naturally occurring organic plant fiber:

| Example | Fiber Concentration |
|---|---|
| 42 | 3% |
| 43 | 5% |
| 44 | 10% |
| 45 | 20% |
| 46 | 40% |
| 47 | 70% |

The fibrous component is blended within the thermoplastic starch melt under conditions of sufficient shear so as to substantially homogeneously blend the individual fibers throughout the thermoplastic starch melt. This occurs prior to the addition of the inorganic filler, which is thereafter blended within the mixture at lower shear. As the fibrous component is increased, the resulting thermoplastic starch compositions have increased tensile strength, compressive strength, toughness, fracture energy, and modulus of elasticity. A wide variety of articles can be shaped from the foregoing compositions.

Examples 48–56

Any of the foregoing examples is modified such that at least a portion of the low volatile plasticizer and/or water is replaced with one or more of the following plasticizers:

| Example | Plasticizer |
|---|---|
| 48 | propylene glycol |
| 49 | 1,3-propanediol |
| 50 | neopentylglycol |
| 51 | sorbitol acetate |
| 52 | DMSO |
| 53 | polyvinyl alcohol (3–20 repeating units) |
| 54 | polyethylene glycol |
| 55 | polyglycerols (2–10 repeating units) |

The concentrations of the foregoing plasticizers are adjusted in order to yield a mixture of starch and plasticizer that is able to form a melt within a temperature range from as low as 70° C. to as high as 250° C.

Example 57

Any of the foregoing examples in which the additional thermoplastic polymer has a melting point or softening range that is higher than the thermoplastic starch subcomponent will generally require additional heating to raise the temperature of the thermoplastic phase to the softening point of the additional polymer in order to form a substantially homogeneous mixture of the thermoplastic phase components.

Example 58

To any of the foregoing examples is added a cross-linking agent.

Example 59

To any of the foregoing examples is added a reactive substrate that is able to react with, or otherwise block, at least some of the hydroxyl groups along the starch polymer.

Example 60

Any appropriate combination of starch and polymer capable of forming one or more condensation reaction products with starch is processed in a manner that reduces the moisture content of the mixture to below about 0.1% of the mixture so as to promote the formation of such condensation reaction products.

Example 61

Any of the foregoing compositions is molded in a manner so as to yield a thermoplastic starch foam, such as by utilizing water as the foaming agent during a heated molding process.

VI. SUMMARY

From the foregoing, it will be appreciated that the present invention provides improved thermoplastic starch compositions and methods for manufacturing low cost, environmentally friendly sheets, films, articles made therefrom, and molded articles having appropriate mechanical properties similar to, e.g., paper, paperboard, polystyrene, plastic, metal sheets, and the like.

The present invention also disclosed how to make thermoplastic starch compositions which allow for the formation of a variety of containers and other articles using existing manufacturing equipment and techniques presently used to form articles from paper, polymer films, or moldable plastic materials.

The present invention further teaches how to manufacture environmentally friendly thermoplastic starch compositions that only include a fraction of the starch content compared to other starch-based compositions presently being utilized.

In addition, the present invention provides thermoplastic starch compositions that yield articles that are readily biodegradable and or degradable into substances commonly found on the earth.

Furthermore, the present invention provides thermoplastic starch compositions and methods which allow for the manufacture of sheets, containers and other articles at a cost that is comparable to, or even lower than, the cost of existing methods of manufacturing articles from paper, plastics, or other materials.

Moreover, the present invention provides thermoplastic starch compositions and methods which allow for the inclusion of less organic polymer materials while overcoming many of the problems associated with conventional starch melts.

The present invention further provides thermoplastic starch compositions and methods which allow for the inclusion of significant quantities of natural inorganic mineral fillers and, optionally fibrous materials, either organic or inorganic, within such thermoplastic starch compositions.

Finally, the present invention provides thermoplastic starch compositions that have improved physical properties, such as increased thermal stability, increased modulus of elasticity, compressive strength, and toughness compared to conventional thermoplastic starch compositions.

The present invention may be embodied in other specific forms without departing from its spirit or essential characteristics. The described embodiments are to be considered in all respects as illustrative only and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A thermoplastic starch composition comprising:
    a thermoplastic phase including thermoplastic starch formed by mixing and heating starch and at least one plasticizer under conditions so as to form a thermoplastic starch melt and at least one additional thermoplastic polymer blended with the thermoplastic starch; and
    a solid particulate filler phase dispersed throughout the thermoplastic phase and included in an amount from about 15% to about 95% by weight of the thermoplastic starch composition.

2. A thermoplastic starch composition as defined in claim 1, wherein the plasticizer has a vapor pressure less than 1 bar when the thermoplastic phase is in a melted state.

3. A thermoplastic starch composition as defined in claim 2, wherein the plasticizer is included in an amount from about 1% to about 70% by weight of the starch and plasticizer.

4. A thermoplastic starch composition as defined in claim 2, wherein the plasticizer is included in an amount from about 5% to about 50% by weight of the starch and plasticizer.

5. A thermoplastic starch composition as defined in claim 2, wherein the plasticizer is included in an amount from about 10% to about 30% by weight of the starch and plasticizer.

6. A thermoplastic starch composition as defined in claim 2, wherein the plasticizer is at least one of ethylene glycol, propylene glycol, glycerin, 1,3-propandiol, 1,2-butandiol, 1,3-butandiol, 1,4-butandiol, 1,5-pentandiol, 1,5-hexandiol, 1,6-hexandiol, 1,2,6-hexantriol, 1,3,5-hexantriol, neopentylglycol, sorbitol acetate, sorbitol diacetate, sorbitol monoethoxylate, sorbitol diethoxylate, sorbitol hexaethoxylate, sorbitol dipropoxylate, aminosorbitol, trihydroxymethylaminomethane, glucose/PEG, the reaction product of ethylene oxide with glucose, trimethylolpropane monoethoxylate, mannitol monoacetate, mannitol monoethoxylate, butyl glucoside, glucose monoethoxylate, α-methyl glucoside, the sodium salt of carboxymethylsorbitol, polyglycerol monoethoxylate, erythritol, pentaerythritol, arabitol, adonitol, xylitol, mannitol, iditol, galactitol, allitol, sorbitol, polyhydric alcohols generally, esters of glycerin, DMSO, monoglycerides, diglycerides, alkylamides, polyols, trimethylolpropane, polyvinylalcohol with from 3 to 20 repeating units, or polyglycerols with from 2 to 10 repeating units.

7. A thermoplastic starch composition as defined in claim 1, wherein the plasticizer has a vapor pressure greater than 1 bar when the thermoplastic phase is in a melted state.

8. A thermoplastic starch composition as defined in claim 7, wherein the plasticizer is included in an amount in a range from about 5% to about 40% by weight of the starch and plasticizer.

9. A thermoplastic starch composition as defined in claim 7, wherein the plasticizer is selected from the group consisting of water, alcohols, aldehydes, ketones, organic acids, amines, esters, amides, imides, and mixtures thereof.

10. A thermoplastic starch composition as defined in claim 1, wherein the thermoplastic starch is melted in the presence of water and at least one plasticizer having a vapor pressure of less than 1 bar when the starch is in a melted state.

11. A thermoplastic starch composition as defined in claim 1, wherein the particulate filler is included in an amount in a range from about 5% to about 50% by volume of the thermoplastic starch composition.

12. A thermoplastic starch composition as defined in claim 1, wherein the particulate filler is included in an amount in a range from about 50% to about 90% by volume of the thermoplastic starch composition.

13. A thermoplastic starch composition as defined in claim 1, wherein the particulate filler is included in an amount greater than about 25% by weight of the thermoplastic starch composition.

14. A thermoplastic starch composition as defined in claim 1, wherein the particulate filler is included in an amount greater than about 35% by weight of the thermoplastic starch composition.

15. A thermoplastic starch composition as defined in claim 1, wherein the particulate filler is included in an amount greater than about 50% by weight of the thermoplastic starch composition.

16. A thermoplastic starch composition as defined in claim 1, wherein the solid particulate filler is at least one of sand, crushed rock, bauxite, granite, limestone, sandstone, glass beads, mica, clay, alumina, silica, fly ash, fumed silica, kaolin, glass microspheres hollow glass spheres, porous ceramic spheres, gypsum mono- and dehydrates, insoluble salts, calcium carbonate, magnesium carbonate, calcium hydroxide, calcium aluminate, magnesium carbonate, titanium dioxide, talc, ceramics, pozzolans, zirconium compounds, xonotlite, silicate gels, lightweight expanded clays, perlite, vermiculite, hydraulic cement particles, pumice, zeolites, exfoliated rock, ores, natural minerals, metallic particles, or metallic flakes.

17. A thermoplastic starch composition as defined in claim 1, wherein the at least one additional thermoplastic polymer comprises at least one polyester selected from the group consisting of aliphatic polyesters, aliphatic-aromatic copolyesters, and mixtures thereof.

18. A thermoplastic starch composition as defined in claim 1, further including a void phase dispersed throughout the thermoplastic starch composition.

19. A thermoplastic starch composition comprising:
   a thermoplastic phase including thermoplastic starch formed by mixing and heating starch and at least one plasticizer under conditions so as to form a thermoplastic starch melt having a water content of less than about 5% by weight while in a melted state and prior to cooling, wherein the at least one plasticizer has a vapor pressure of less than about 1 bar when the thermoplastic phase is in melted state; and
   a solid particulate filler phase dispersed throughout the thermoplastic phase and included in an amount from about 5% to about 95% by weight of the thermoplastic starch composition.

20. A thermoplastic starch composition as defined in claim 19, wherein the plasticizer is at least one of ethylene glycol, propylene glycol, glycerin, 1,3-propandiol, 1,2-butandiol, 1,3-butandiol, 1,4-butandiol, 1,5-pentandiol, 1,5-hexandiol, 1,6-hexandiol, 1,2,6-hexantriol, 1,3,5-hexantriol, neopentylglycol, sorbitol acetate, sorbitol diacetate, sorbitol monoethoxylate, sorbitol diethoxylate, sorbitol hexaethoxylate, sorbitol dipropoxylate, aminosorbitol, trihydroxymethylaminomethane, glucose/PEG, the reaction product of ethylene oxide with glucose, trimethylolpropane monoethoxylate, mannitol monoacetate, mannitol monoethoxylate, butyl glucoside, glucose monoethoxylate, α-methyl glucoside, the sodium salt of carboxymethylsorbitol, polyglycerol monoethoxylate, erythritol, pentaerythritol, arabitol, adonitol, xylitol, mannitol, iditol, galactitol, allitol, sorbitol, polyhydric alcohols generally, esters of glycerin, DMSO, monoglycerides, diglycerides, alkylamides, polyols, trimethylolpropane, polyvinylalcohol with from 3 to 20 repeating units, or polyglycerols with from 2 to 10 repeating units.

21. A thermoplastic starch composition as defined in claim 19, wherein the thermoplastic starch composition includes from about 1% to about 6% by weight of loosely bound water after cooling with water.

22. A thermoplastic starch composition as defined in claim 19, wherein the plasticizer is included in an amount from about 1% to about 70% by weight of the starch and plasticizer.

23. A thermoplastic starch composition as defined in claim 19, wherein the plasticizer is included in an amount from about 5% to about 50% by weight of the starch and plasticizer.

24. A thermoplastic starch composition as defined in claim 19, wherein the plasticizer is included in an amount from about 10% to about 30% by weight of the starch and plasticizer.

25. A thermoplastic starch composition as defined in claim 19, wherein the thermoplastic starch melt initially includes a volatile plasticizing solvent having a vapor pressure greater than 1 bar, wherein at least a portion of the solvent is subsequently removed from the thermoplastic starch melt by evaporation during processing and prior to cooling and solidification of the thermoplastic starch composition.

26. A thermoplastic starch composition as defined in claim 25, wherein the volatile plasticizing solvent is selected from the group consisting of water, alcohols, aldehydes, ketones, organic acids, amines, esters, amides, imides, and mixtures thereof.

27. A thermoplastic starch composition as defined in claim 25, wherein the volatile plasticizing solvent is initially included in an amount in a range from about 5% to about 40% by weight of the starch and solvent, wherein the solvent has a final concentration of less than about 5% by weight of the thermoplastic starch melt as a result of being removed by evaporation while the thermoplastic starch is a melted state and prior to cooling.

28. A thermoplastic starch composition as defined in claim 19, wherein the starch is derived from at least one source selected from the group consisting of corn, waxy corn, potatoes, wheat, sorghum, rice, waxy rice, tapioca, cassava, manioc, sweet potatoes, arrow root, and pith of sago palm.

29. A thermoplastic starch composition as defined in claim 19, wherein the thermoplastic starch is formed from native starch that initially includes its natural water content.

30. A thermoplastic starch composition as defined in claim 19, wherein the thermoplastic starch is formed from native starch that has been pre-dried to a water content of less than about 10% by weight.

31. A thermoplastic starch composition as defined in claim 19, wherein the thermoplastic starch is formed from native starch that has been pre-dried to a water content of less than about 5% by weight.

32. A thermoplastic starch composition as defined in claim 19, wherein the thermoplastic starch is formed from native starch that has been pre-dried to a water content of less than about 3% by weight.

33. A thermoplastic starch composition as defined in claim 19, wherein the thermoplastic starch melt is formed under conditions so as to have a water content of less than about 3% by weight while in a melted state and prior to cooling.

34. A thermoplastic starch composition as defined in claim 19, wherein the thermoplastic starch melt is formed under conditions so as to have a water content of less than about 1% by weight while in a melted state and prior to cooling.

35. A thermoplastic starch composition as defined in claim 19, wherein the particulate filler is included in an amount from about 5% to about 50% by volume of the thermoplastic starch composition.

36. A thermoplastic starch composition as defined in claim 19, wherein the particulate filler is included in an amount from about 50% to about 90% by volume of the thermoplastic starch composition.

37. A thermoplastic starch composition as defined in claim 19, wherein the particulate filler is included in an amount greater than about 15% by weight of the thermoplastic starch composition.

38. A thermoplastic starch composition as defined in claim 19, wherein the particulate filler is included in an amount greater than about 25% by weight of the thermoplastic starch composition.

39. A thermoplastic starch composition as defined in claim 19, wherein the particulate filler is included in an amount greater than about 35% by weight of the thermoplastic starch composition.

40. A thermoplastic starch composition as defined in claim 19, wherein the particulate filler is included in an amount greater than about 50% by weight of the thermoplastic starch composition.

41. A thermoplastic starch composition as defined in claim 19, wherein the solid particulate filler is at least one of sand, crushed rock, bauxite, granite, limestone, sandstone, glass beads, mica, clay, alumina, silica, fly ash, fumed silica, kaolin, glass microspheres, hollow glass spheres, porous ceramic spheres, gypsum mono- and dihydrates, insoluble salts, calcium carbonate, magnesium carbonate, calcium hydroxide, calcium aluminate, magnesium carbonate, titanium dioxide, talc, ceramics, pozzolans, zirconium compounds, xonotlite, silicate gels, lightweight expanded clays, perlite, vermiculite, hydraulic cement particles, pumice, zeolites, exfoliated rock, ores, natural minerals, metallic particles, or metallic flakes.

42. A thermoplastic starch composition as defined in claim 19, wherein the thermoplastic phase further includes at least one additional thermoplastic polymer blended with the thermoplastic starch.

43. A thermoplastic starch composition as defined in claim 42, wherein the additional thermoplastic polymer comprises a biodegradable synthetic thermoplastic polymer.

44. A thermoplastic starch composition as defined in claim 42, wherein the additional thermoplastic polymer comprises a polycondensate material.

45. A thermoplastic starch composition as defined in claim 44, wherein the polycondensate material is capable of cross-condensing with at least a portion of the thermoplastic starch in order to form a condensation product between the thermoplastic starch and polycondensate material.

46. A thermoplastic starch composition as defined in claim 44, wherein the polycondensate material is selected from the group consisting of polyesters, polyamides, polyesteramides, polyimides, polylactones, polylactides, polylactams, polyethers, copolymers thereof, mixtures thereof, and derivatives thereof.

47. A thermoplastic starch composition as defined in claim 42, wherein the additional thermoplastic polymer includes reactive sites that are able form a chemical bond with the thermoplastic starch.

48. A thermoplastic starch composition as defined in claim 42, wherein the additional thermoplastic polymer is at least one of:
   (a) homopolymers of aliphatic or aromatic hydroxyacid monomers or their corresponding lactones or lactides;
   (b) copolymers of a first monomer of group (a) and a second monomer selected from the group consisting of
      (i) a monomer of group (a) different from the first monomer and (ii) aliphatic or aromatic isocyanates;
   (c) block or graft copolymers between the homopolymers and copolymers selected from the groups consisting of groups (a) and (b) and one or more components selected from the group consisting of:
      (i) cellulose, cellulose esters, and cellulosic ethers;
      (ii) amylose, amylopectin, natural starch, and modified starches;
      (iii) polymers derived from reaction of diols selected from the groups consisting of ethylene glycol, propylene glycol, butylene glycol, polyoxyethylene glycol, polyoxypropylene glycol, neopentyl glycol, 1,4-butandiol, cyclohexandiol, and dianhydrous sorbitol, polyester prepolymers, and polymers having diol terminal groups reacted with a substance selected from the group consisting of:
         aromatic bifunctional isocyanates, aliphatic bifunctional isocyanates, and epoxides;
         aliphatic bicarboxylic acids selected from the group consisting of malonic, succinic, maleic, fumaric, itaconic, glutaric, adipic, pimelic, suberic, azelaic, and sebacic acids;
         bicarboxylic cycloaliphatic acids; and
         aromatic acids and aromatic anhydrides;
      (iv) polyurethanes, polyamide-urethanes from diisocyanates and aminoalcohols, polyamides, polyesteramides from bicarboxylic acids and aminoalcohols, and polyester-urea from aminoacids and diesters of glycols;
      (v) polyhydroxylated polymers, polyvinylalcohol, ethylene-vinylalcohol copolymers, and polysaccharides;
      (vi) polyvinylpyrrolidone, polyvinylpyrrolidone-vinylacetate copolymers, and polymethacrylates;
   (d) polyesters obtained from monomers or comonomers defined in groups (a) and (b) that are upgraded with chain extenders selected from the group consisting of isocyanates, epoxides, phenylesters, and aliphatic carbonates; or
   (e) polyesters obtained from monomers and comonomers defined in groups (a) and (b) that are partially cross-linked by means of one or more polyfunctional acids.

49. A thermoplastic starch composition as defined in claim 42, wherein the additional thermoplastic polymer is selected from the group consisting of polyesters made from 6-hydroxycaproic acid, 6-hydroxyoctanoic, 3,7-dimethyl-6-hydroxyoctanoic acid, the corresponding lactones of the foregoing, and mixtures thereof.

50. A thermoplastic starch composition as defined in claim 42, wherein the additional thermoplastic polymer is an aliphatic-aromatic copolyester.

51. A thermoplastic starch composition as defined in claim 42, wherein the additional thermoplastic polymer is selected from the group consisting of polyolefins, alkylsiloxanes, polyolefin adipates, polyolefin adipates, polyolefin teraphyhalates, ethylenrinylacetate copolymer, vinyl resins, polystyrenes, and mixtures thereof.

52. A thermoplastic starch composition as defined in claim 42, wherein the additional thermoplastic polymer includes a substantially hydrophilic thermoplastic polymer.

53. A thermoplastic starch composition as defined in claim 42, wherein the additional thermoplastic polymer is selected from the group consisting of proteins, cellulose-based materials, polysaccharide gums, polymers derived from plants, animals, and animal products, and mixtures thereof.

54. A thermoplastic starch composition as defined in claim 42, wherein the ratio of thermoplastic starch to additional thermoplastic polymer is in a range from about 1:9 to about 9:1.

55. A thermoplastic starch composition as defined in claim 42, wherein the ratio of thermoplastic starch to additional thermoplastic polymer is in a range from about 2:8 to about 8:2.

56. A thermoplastic starch composition as defined in claim 42, wherein the ratio of thermoplastic starch to additional thermoplastic polymer is in a range from about 3:7 to about 7:3.

57. A thermoplastic starch composition as defined in claim 19, wherein the thermoplastic phase further includes a thermosetting resin.

58. A thermoplastic starch composition as defined in claim 19, wherein the thermoplastic phase further includes a cross-linking agent.

59. A thermoplastic starch composition as defined in claim 58, wherein the cross-linking agent is selected from the group of polyacids, polyamines, anhydrides, and derivatives of the foregoing.

60. A thermoplastic starch composition as defined in claim 19, wherein the thermoplastic phase further includes a reactive component that is capable of reacting with hydroxyl groups of the thermoplastic starch.

61. A thermoplastic starch composition as defined in claim 19, wherein the thermoplastic starch composition further includes an admixture selected from the group consisting of lubricants, dispersants, humectants, waterproofing agents, phase mediators, softeners, mold release agents, flexibilizers, and blending enhancers.

62. A thermoplastic starch composition as defined in claim 19, wherein the thermoplastic phase has a concentration in a range from about 10% to about 90% by volume of the thermoplastic starch composition.

63. A thermoplastic starch composition as defined in claim 19, wherein the thermoplastic phase has a concentration in a range from about 20% to about 80% by volume of the thermoplastic starch composition.

64. A thermoplastic starch composition as defined in claim 19, wherein the thermoplastic phase has a concentration in a range from about 30% to about 70% by volume of the thermoplastic starch composition.

65. A thermoplastic starch composition as defined in claim 19, farther including a fibrous phase comprising individual fibers having an aspect ratio greater than about 10:1 and dispersed throughout the thermoplastic phase in an amount of up to about 90% by weight of the thermoplastic starch composition.

66. A thermoplastic starch composition as defined in claim 65, wherein the individual fibers have an aspect ratio greater than about 25:1.

67. A thermoplastic starch composition as defined in claim 65, wherein the individual fibers have a length in a range from about 0.1 mm to about 2 mm.

68. A thermoplastic starch composition as defined in claim 65, wherein the individual fibers have a length greater than about 2 mm.

69. A thermoplastic starch composition as defined in claim 65, wherein the fibrous phase comprises inorganic fibers selected from the group consisting of glass fibers, graphite fibers, silica fibers, ceramic fibers, rock wool fibers, metal fibers, and mixtures thereof.

70. A thermoplastic starch composition as defined in claim 65, wherein the fibrous phase comprises organic fibers selected from the group consisting of plant derived fibers, cotton, hard wood fibers, softwood fibs, flax, abaca, sisal, ramie, hemp, bagasse, recycled paper fibers, polymer fibers, and mixtures thereof.

71. A thermoplastic starch composition as defined in claim 65, wherein the fibrous phase is included in an amount in a range from about 3% to about 80% by weight of the thermoplastic starch composition.

72. A thermoplastic starch composition as defined in claim 65, wherein the fibrous phase is included in an amount in a range from about 5% to about 60% by weight of the thermoplastic starch composition.

73. A thermoplastic starch composition as defined in claim 65, wherein the fibrous phase is included in an amount in a range from about 10% to about 30% by weight of the thermoplastic starch composition.

74. A thermoplastic starch composition as defined in claim 19, wherein the particulate filler comprises an organic filler.

75. A thermoplastic starch composition as defined in claim 74, wherein the organic filler is at least one of sawdust, wood flour, bran, or wood flakes.

76. A thermoplastic starch composition as defined in claim 19, further including a phase comprising discrete organic globules of at least partially melted organic filler.

77. A thermoplastic starch composition as defined in claim 19, further including a discontinuous phase of substantially nonagglomerated voids dispersed throughout the thermoplastic phase.

78. A thermoplastic starch composition as defined in claim 19, wherein the thermoplastic starch composition is in the form of a molten material capable of being shaped into a desired article of manufacture and then substantially solidified by cooling to below its melting point or range.

79. A thermoplastic starch composition as defined in claim 19, wherein the thermoplastic starch composition is in the form of a solidified granulate or other intermediate form that is capable of being remelted as a thermoplastic material and reshaped into a desired article of manufacture.

80. A thermoplastic starch composition as defined in claim 19, wherein the thermoplastic starch composition is formed into a film having a thickness in a range from about 1 micron to about 1 mm.

81. A thermoplastic starch composition as defined in claim 19, wherein the thermoplastic starch composition is formed into a film having a thickness in a range from about 0.001 mm to about 1 cm.

82. A thermoplastic starch composition as defined in claim 19, wherein the thermoplastic starch composition is formed into a molded article having a wall thickness in a range from about 0.1 mm to about 10 cm.

83. A thermoplastic starch composition as defined in claim 19, wherein at least the thermoplastic phase of the thermoplastic starch composition is biodegradable.

84. A thermoplastic starch composition as defined in claim 19, wherein the thermoplastic phase of the thermoplastic starch composition is impermeable to water.

85. A thermoplastic starch composition as defined in claim 19, wherein the thermoplastic phase of the thermoplastic starch composition is degradable in water.

86. A thermoplastic starch composition as defined in claim 19, wherein the thermoplastic starch composition is formed into a film or sheet and has been stretched after initial formation in at least one direction.

87. A thermoplastic starch composition as defined in claim 19, wherein the thermoplastic starch has a crystallinity of less than about 5%.

88. A thermoplastic starch composition as defined in claim 19, wherein the thermoplastic starch composition has a melting point or range from about 70° C. to about 240° C.

89. A thermoplastic starch composition as defined in claim 19, wherein the thermoplastic starch composition has a melting point or range from about 80° C. to about 220° C.

90. A thermoplastic starch composition as defined in claim 19, wherein the thermoplastic starch composition has a melting point or range from about 100° C. to about 200° C.

91. A thermoplastic starch composition as defined in claim 19, wherein the thermoplastic starch composition is formed into a laminate coating applied to a substrate.

92. A thermoplastic starch composition comprising:
a thermoplastic phase including a mixture of thermoplastic starch and at least one additional thermoplastic polymer, wherein the thermoplastic starch is formed by mixing and heating starch and at least one plasticizer under conditions so as to form a thermoplastic starch melt and so that at least a portion of the thermoplastic starch melt forms at least one condensation product with the at least one additional thermoplastic polymer;
a solid particulate filler phase dispersed throughout the thermoplastic phase and included in an amount from about 5% to about 95% by weight of the thermoplastic starch composition.

93. A thermoplastic starch composition as defined in claim 92, wherein the additional thermoplastic polymer is at least one member selected from the group consisting of polyester, polyesteramides, and derivatives thereof.

94. A thermoplastic starch composition comprising:
- a thermoplastic phase including thermoplastic starch formed by mixing and heating starch and at least one plasticizer under conditions so as to form a thermoplastic starch melt;
- a solid particulate filler phase dispersed throughout the thermoplastic phase and included in an amount from about 5% to about 95% by weight of the thermoplastic starch composition; and
- a fibrous phase dispersed throughout the thermoplastic phase and comprising individual fiber in a concentration of from about 3% to about 70% by weight of the thermoplastic starch composition.

95. A thermoplastic starch composition as defined in claim 94, wherein the thermoplastic phase further includes at least one biodegradable hydrophobic synthetic polymer blended with the thermoplastic starch.

96. An inorganically filled, destructurized starch composition comprising:
- (a) a thermoplastic phase including destructurized starch and at least one additional polymer, wherein the destructurized starch is formed by mixing and heating starch with water under conditions so as to form a destructurized starch melt having a water concentration in a range from about 5% to about 40% by weight of the starch and water, wherein the destructurized starch and additional thermoplastic polymer are substantially homogeneously blended together; and
- a solid particulate inorganic filler phase dispersed throughout the thermoplastic phase and included in an amount greater than about 15% by weight of the destructurized starch composition.

* * * * *

UNITED STATES PATENT AND TRADEMARK OFFICE
CERTIFICATE OF CORRECTION

PATENT NO.    : 6,231,970 B1
DATED         : May 15, 2001
INVENTOR(S)   : Per Just Andersen, Simon K. Hodson and Harald Schmidt It is certified that error appears in the above-identified patent and that said Letters Patent is hereby corrected as shown below:

Title page,
Item [75], Inventors, insert -- Harald Schmidt, of Emmerich, Germany --
ABSTRACT,
Line 3, after "component" insert -- . --

Column 1,
Line 45, change "containers" to -- containers) --

Column 3,
Line 39, after "resulting" insert -- gelatinization or melting point of the starch) and it must be somewhat polar in order to be --

Column 4,
Line 11, change "et al;" to -- et al.; --
Line 34, before "removed" insert -- be --
Lines 42-43, change "L örcks" to -- Lörcks --

Column 5,
Line 37, change "paper." to -- paper, --

Column 6,
Line 30, after "melt" insert -- . --
Line 31, after "with" change "on," to -- one --

Column 8,
Line 48, change "fiber;" to -- fibers --

Column 11,
Line 41, after "reinforcement" insert -- , --

Column 12,
Line 5, before "fact" insert -- the --
Line 24, change "The" to -- the --

Column 13,
Line 23, after ' "flowable" ' insert -- on the other. --

UNITED STATES PATENT AND TRADEMARK OFFICE
CERTIFICATE OF CORRECTION

PATENT NO. : 6,231,970 B1
DATED : May 15, 2001
INVENTOR(S) : Per Just Andersen, Simon K. Hodson and Harald Schmidt It is certified that error appears in the above-identified patent and that said Letters Patent is hereby corrected as shown below:

Column 14,
Line 9, after "transition" delete [,]
Line 12, change "polymer" to -- polymers --
Line 38, delete [generally]

Column 17,
Line 35, after "phases" delete [,]
Line 38, change "phase" to -- phases --
Line 53, after "phases" change "is" to -- are --

Column 18,
Line 47, change "Theologically" to -- rheologically --

Column 19,
Line 38, change "particular" to -- particularly --
Line 61, after "added" insert -- to --

Column 20,
Line 14, change "predried" to -- pre-dried --
Line 33, before "concentration" insert -- a --

Column 22,
Line 2, before "polymers" insert -- more --
Line 33, after "to" insert -- be --

Column 23,
Lines 5, 7 and 8, change "cm¯3/2" to -- $cm^{-3/2}$ --
Line 20, change "tee" to -- the --
Line 38, change "more slow" to -- slower --

Column 24,
Line 23, after "blend" insert -- of --

Column 29,
Line 46, change "Similar," to -- Similarly, --
Line 48, change "allow" to -- allows --

Column 30,
Line 52, before "the" insert -- of --

UNITED STATES PATENT AND TRADEMARK OFFICE
CERTIFICATE OF CORRECTION

PATENT NO.   : 6,231,970 B1
DATED        : May 15, 2001
INVENTOR(S)  : Per Just Andersen, Simon K. Hodson and Harald Schmidt It is certified that error appears in the above-identified patent and that said Letters Patent is hereby corrected as shown below:

Column 36,
Line 65, change "Theological" to -- rheological --

Column 39,
Line 19, change "in art" to -- in the art --

Column 41,
Line 6, change "present" to -- presence --

Column 42,
Line 30, before "comprises" delete [will]

Column 51,
Line 13, change "filly" to -- fully --

Column 58,
Line 10, change "is a" to -- is in a --

Column 59,
Line 35, after "able" insert -- to --

Column 60,
Line 32, delete the second occurrance of [polyolefin adipates,]

Signed and Sealed this

Ninth Day of July, 2002

*Attest:*

JAMES E. ROGAN
*Attesting Officer*          *Director of the United States Patent and Trademark Office*